(12) United States Patent
Maeda et al.

(10) Patent No.: US 11,574,340 B2
(45) Date of Patent: Feb. 7, 2023

(54) INFORMATION PROVIDING METHOD AND INFORMATION PROVIDING DEVICE

(71) Applicant: PANASONIC INTELLECTUAL PROPERTY CORPORATION OF AMERICA, Torrance, CA (US)

(72) Inventors: Manabu Maeda, Osaka (JP); Motoji Ohmori, Osaka (JP); Yuichi Futa, Ishikawa (JP); Natsume Matsuzaki, Osaka (JP); Hideki Matsushima, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 897 days.

(21) Appl. No.: 16/452,158

(22) Filed: Jun. 25, 2019

(65) Prior Publication Data

US 2019/0311402 A1   Oct. 10, 2019

Related U.S. Application Data

(63) Continuation of application No. 14/276,225, filed on May 13, 2014, now Pat. No. 10,380,635.

(30) Foreign Application Priority Data

May 20, 2013   (JP) .................................. 2013-106151

(51) Int. Cl.
*G01C 21/36* (2006.01)
*G06Q 30/02* (2012.01)

(52) U.S. Cl.
CPC ..... *G06Q 30/0255* (2013.01); *G01C 21/3641* (2013.01); *G06Q 30/0251* (2013.01); *G06Q 30/0269* (2013.01)

(58) Field of Classification Search
CPC .......... G06Q 30/0255; G06Q 30/0251; G06Q 30/0269; G06Q 30/0265; G01C 21/3641
See application file for complete search history.

(56) References Cited

U.S. PATENT DOCUMENTS

2006/0149459 A1\* 7/2006 Matsuura ........... G01C 21/3484
701/540
2009/0254971 A1   10/2009 Herz et al.
(Continued)

FOREIGN PATENT DOCUMENTS

JP        2009-252177        10/2009
JP        2012-123488 A       6/2012
(Continued)

OTHER PUBLICATIONS

Nov. 1, 2016 Office Action in parent case U.S. Appl. No. 14/276,225.
(Continued)

*Primary Examiner* — Abby Y Lin
*Assistant Examiner* — Dylan M Katz
(74) *Attorney, Agent, or Firm* — Greenblum & Bernstein, P.L.C.

(57) ABSTRACT

An information providing method and apparatus a) transmits a request via a network, for recommended driving information for a first user to be received and displayed on a display of the first user, b) receives from the network driving data from a plurality of vehicles about how a plurality of users drive their vehicles including the first user, c) extracts a similar user from among the plurality of users who drives a vehicle with a predetermined similarity to how the first user drives a vehicle, and determines recommended driving information of the similar user from the similar user's driving history, d) transmits over the network to the first user the recommended driving information of the similar user, (Continued)

and e) displays on a display of the first user the recommended driving information of the similar user.

16 Claims, 25 Drawing Sheets

(56) References Cited

U.S. PATENT DOCUMENTS

| | | |
|---|---|---|
| 2010/0030638 A1 | 2/2010 | Davis, III et al. |
| 2011/0093476 A1 | 4/2011 | Fukazawa et al. |
| 2013/0302756 A1* | 11/2013 | Takeuchi ............ B60W 30/18 |
| | | 434/64 |
| 2016/0025027 A1* | 1/2016 | Mentele ............... F02D 41/22 |
| | | 701/102 |

FOREIGN PATENT DOCUMENTS

| | | |
|---|---|---|
| JP | 2012-173818 A | 9/2012 |
| JP | 2012-242844 A | 12/2012 |
| WO | 2009/125712 | 10/2009 |

OTHER PUBLICATIONS

Apr. 14, 2017 Office Action in parent case U.S. Appl. No. 14/276,225.
May 15, 2018 Office Action in parent case U.S. Appl. No. 14/276,225.
Dec. 4, 2018 Office Action in parent case U.S. Appl. No. 14/276,225.

\* cited by examiner

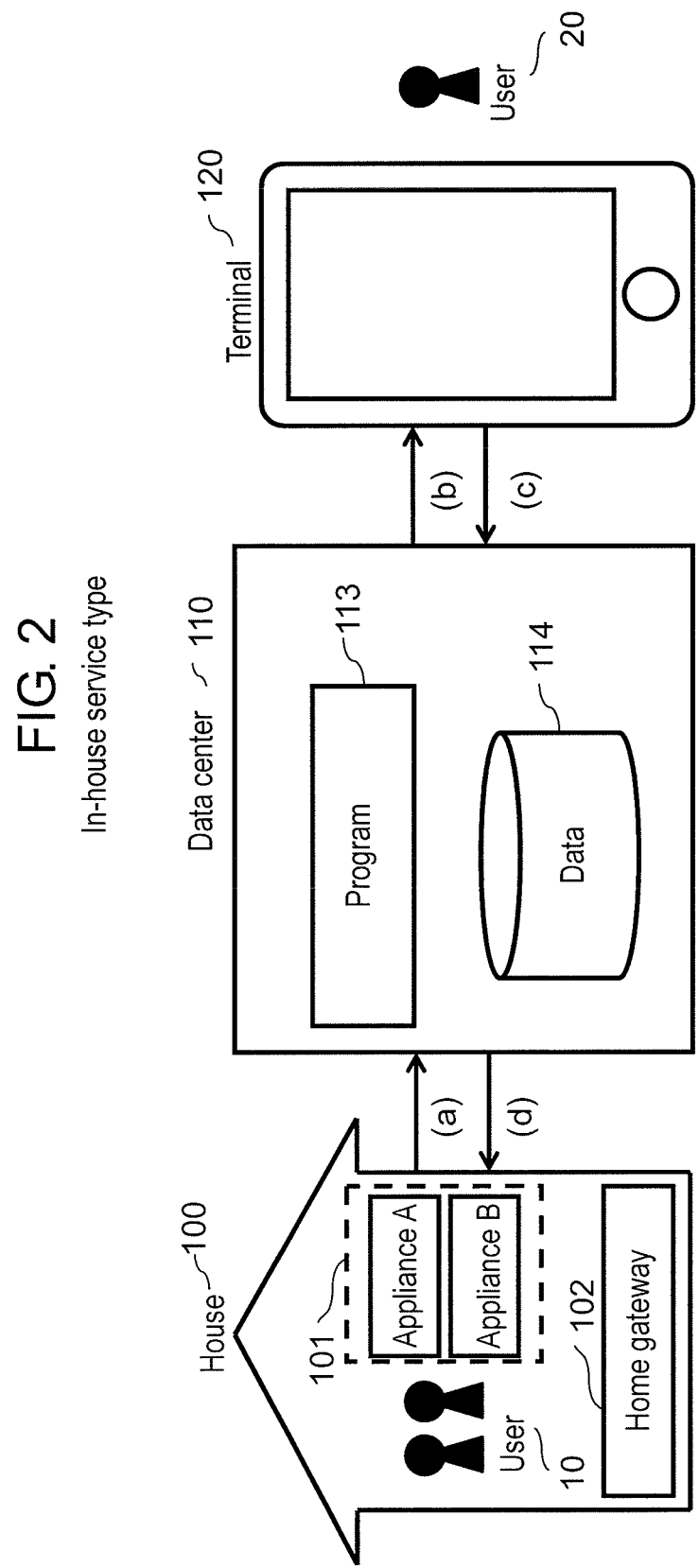

Block diagram of a data center (SaaS, PaaS, IaaS)

Block diagram of a service provider

FIG. 8

Data structure of a user information list — 200

| User ID | User information | | |
|---|---|---|---|
| | Name | Address | ... |
| U1 | Alice | | |
| U2 | Bob | | |
| U3 | Carol | | |

FIG. 9

Data structure of an appliance list — 201

| User ID | Appliance ID list |
|---|---|
| U1 | E3、E4、... |
| U2 | E1、E6、... |
| U3 | E2、E5、... |
| ... | |

Data structure of a preference information list

Data structure of home appliance history

FIG. 12

Data structure of a store information list

220

| Store ID | Store information | | | |
|---|---|---|---|---|
| | Store name | Address | Icon | Category |
| S1 | | aaa city xxx | iaa.png | sweet, original, egg |
| S2 | | bbb city yyy | ibb.png | western food, bread, wheat |
| S3 | | ccc city zzz | icc.png | original, vegetable, kyoto |
| ... | | | | |

FIG. 13

Data structure of an evaluation value

230

| User ID | Evaluation value | | | |
|---|---|---|---|---|
| | S1 | S2 | S3 | ... |
| U1 | 5 | 1 | 3 | |
| U2 | 2 | 4 | — | |
| U3 | — | 2 | 4 | |
| ... | | | | |

FIG. 14

Data structure of a similar user list

| User ID | Similar user ID list |
|---------|----------------------|
| U1 | U3、U5、・・・ |
| U2 | U4、U6、・・・ |
| U3 | U1、U5、・・・ |
| ・・・ | |

202

Screen display of a first recommendation

Terminal —120

Screen display for selecting additional user(s)

Screen display of a re- recommendation

Terminal 120

Block diagram of a data center (in-house service type)

Block diagram of terminal 1

Sequence for updating data (terminal 2)

Detailed sequence for data synchronization (terminal 2)

Block diagram of a minimum configuration

Sequence of selecting dissimilar user

INFORMATION PROVIDING METHOD AND INFORMATION PROVIDING DEVICE

CROSS-REFERENCE TO RELATED APPLICATIONS

This application is a continuation of U.S. application Ser. No. 14/276,225, filed May 13, 2014, pending, which claims the foreign priority benefit of Japanese Patent Application No. 2013-106151, filed May 20, 2013. The entire disclosures of above-identified applications are incorporated herein by reference in their entirety.

BACKGROUND OF THE INVENTION

1. Field of the Invention

The present disclosure relates to an information providing method, information providing device, and information providing system for accurately extracting information that is likely to attract an interest of a user.

2. Description of the Related Art

In recent years, attention has been given to a technique for collecting a user's action history and for providing information that is likely to attract an interest of the user based on the action history. The information to be collected as the action history of the user includes, for example, information regarding products purchased by the user, food ordered by the user, articles referred to by the user, and broadcast programs viewed by the user. The action history of the user may include evaluation values that each user sets on these pieces of information. The following steps show an exemplary method of extracting information that is likely to attract an interest of the user. The first step is to extract another user who has a hobby and preference with a tendency identical to a tendency of a targeted user based on the action history of the targeted user. The targeted user is a user who receives provided information. The next step is to provide the targeted user with information about a product or broadcast program that the extracted another user highly evaluates and that the targeted user has not used yet.

The following is an exemplary method of determining whether two arbitrary chosen users have an identical-tendency hobby and preference. It is determined that two users have an identical-tendency hobby and preference when the two users have similar action histories, such as ordering an identical food and evaluating the ordered food similarly.

The following is a method of accurately extracting information that is likely to attract an interest of the user. When extracting another user who has a hobby and preference with a tendency identical to a tendency of the targeted user, a user who has the identical tendency is accurately determined by calculating similarity between the users based on a characteristic vector of each user (for example, see Patent Literature 1).

CITATION LIST

Patent Literature

PTL 1: Unexamined Japanese Patent Publication No. 2009-252177 (WO 2009/125712 A)

SUMMARY OF THE INVENTION

The configuration of Patent Literature 1 has the following problems. Even if a targeted user is provided with information that is highly evaluated by the similar user and that has not been used yet by the targeted user, the information provided to the targeted user may not actually suit the hobby and preference of the targeted user.

One non-limiting and exemplary embodiment provides an information providing method in which the targeted user himself or herself can select another user who has a hobby and preference with a tendency identical to a tendency of the targeted user as a similar user.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature: an information providing method in an information providing system for providing a terminal device of a user with object information via a network based on information from the terminal device of the user, the object information corresponding to preference of the user, the method comprising: receiving evaluation data regarding a plurality of evaluation objects, from a terminal device of each of a plurality of users via the network; associating a first user among the plurality of users with a second user, the second user having an evaluation tendency similar to evaluation data of the first user; providing a terminal device of the first user via the network with first object information regarding a first evaluation object, the first evaluation object having been used by the second user and having not been used by the first user; receiving preference information regarding preference of the plurality of users from a predetermined terminal device via the network; providing the terminal device of the first user with the preference information via the network; receiving from the terminal device of the first user via the network, user information that indicates a third user, the third user being selected by the terminal device of the first user as a user having preference information that corresponds preference of the first user from among the preference information; associating the third user indicated by the user information with the first user and the second user; and providing the terminal device of the first user via the network with second object information regarding a second evaluation object, the second evaluation object having been used by the third user and having not been used by the first user, in addition to the first object information regarding the first evaluation object having been used by the second user and having not been used by the first user.

These general and specific aspects may be implemented using a system, a method, and a computer program, and any combination of systems, methods, and computer programs.

The information providing method of the present disclosure not only provides the targeted user with object information about another user automatically selected by the system, but also allows the targeted user to select another user whom the targeted user is interested in as a similar user. This allows improvement in accuracy of the information to be provided to the targeted user.

BRIEF DESCRIPTION OF DRAWINGS

FIG. 2 illustrates an overall configuration of service pattern 1 of the information providing system according to the present disclosure;

FIG. 8 illustrates data structure of user information list 200 of the information providing system according to the first exemplary embodiment of the present disclosure;

FIG. 9 illustrates data structure of appliance list 201 of the information providing system according to the first exemplary embodiment of the present disclosure;

FIG. 12 illustrates data structure of store information list 220 of the information providing system according to the first exemplary embodiment of the present disclosure;

FIG. 13 illustrates data structure of evaluation value list 230 of the information providing system according to the first exemplary embodiment of the present disclosure;

FIG. 14 illustrates data structure of similar user list 202 of the information providing system according to the first exemplary embodiment of the present disclosure;

Figure 1A:
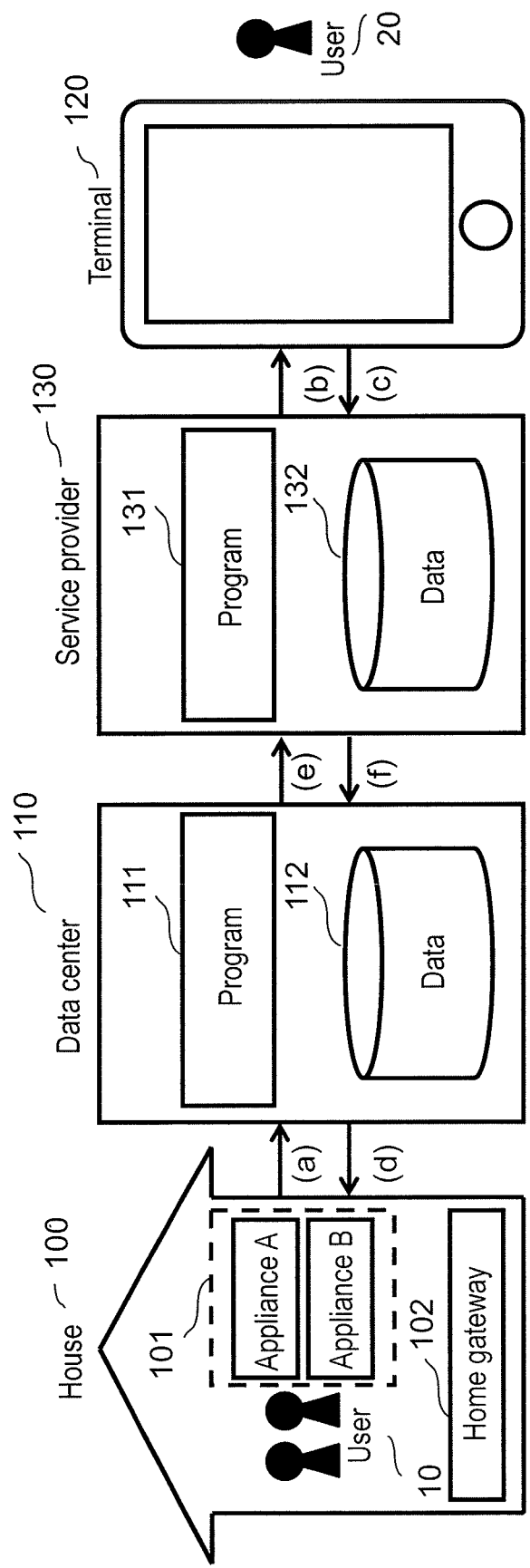
FIGS. 1(A) to 1(C) illustrate an overall configuration of an information providing system according to the present disclosure.

DETAILED DESCRIPTION OF THE PREFERRED EMBODIMENTS (Findings Underlying the Present Disclosure)

Collaborative filtering is known as a technique for selecting information that suits preference of a user from a large amount of data. The collaborative filtering includes a technique for grouping a first user and a second user who has an evaluation tendency similar to evaluation data of the first user, and for providing the first user with information that the second user in the group has used but that the first user has not used yet.

The use of this technique however has the following problem. That is, even when the first user is provided with the information that the second user in the group has used but that the first user has not used yet, the information provided to the first user may not actually suit preference of the first user.

One of the possible reasons for this includes items below. Strictly speaking, the first user and the second user have performed the evaluations in accordance with different standards. Accordingly, even if the first user and the second user seem to have similar evaluation tendencies, evaluations in accordance with a strictly identical standard may have led to different evaluation results.

Another possible reason includes items below. After the information-providing service provider selects another user who has a similar evaluation tendency, a user who receives the information is not provided with means for modifying information about the selected user. Accordingly, the information to be provided to the user does not reflect an intention of the user who receives the information.

Therefore, the present applicants have examined provision of information regarding preference of each user to cloud by another means, separately from evaluation data evaluated by each user. The information regarding each user's preference provided by another means is utilized together with the above-described technique. That is, from among the information regarding another user's preference provided by another means, a third user who suits the first user's preference is selected based on the first user's intention, and the third user is added to the above-described group.

This method is considered to improve the accuracy of the provided information suiting the preference of the first user when the first user is provided with information that another user in the group has used but that the first user has not used yet.

In order to solve the problems described above, the information providing method in the present disclosure includes the following: an information providing method in an information providing system for providing a terminal device of a user with object information via a network based on information from the terminal device of the user, the object information corresponding to preference of the user, the method comprising: receiving evaluation data regarding a plurality of evaluation objects, from a terminal device of each of a plurality of users via the network; associating a first user among the plurality of users with a second user, the second user having an evaluation tendency similar to evaluation data of the first user; providing a terminal device of the first user via the network with first object information regarding a first evaluation object, the first evaluation object having been used by the second user and having not been used by the first user; receiving preference information regarding preference of the plurality of users from a predetermined terminal device via the network; providing the terminal device of the first user with the preference information via the network; receiving from the terminal device of the first user via the network, user information that indicates a third user, the third user being selected by the terminal device of the first user as a user having preference information that corresponds preference of the first user from among the preference information; associating the third user indicated by the user information with the first user and the second user; and providing the terminal device of the first user via the network with second object information regarding a second evaluation object, the second evaluation object having been used by the third user and having not been used by the first user, in addition to the first object information regarding the first evaluation object having been used by the second user and having not been used by the first user.

The applicants have found that the present configuration not only provides the targeted user with object information about another user automatically selected by the system, but also allows the targeted user to select another user whom the targeted user is interested in as a similar user.

The terminal device described above may be a terminal device of each of the plurality of users, and preference information regarding preference of the plurality of users may be inputted from the terminal device of each of the plurality of users.

The present configuration allows each user to input preference information at any time using each user's terminal.

A home appliance in a house of each of the plurality of users may be connected to a network. The terminal device may be the home appliance. Home appliance log information about the home appliance may be inputted via the network to generate preference information regarding preference of the plurality of users.

The present configuration eliminates the need for each user to input all the preference information. Each user only needs to add preference information that home appliance log information fails to generate. When the home appliance log information generates wrong preference information, each user only needs to modify the information.

The association of the first user with the second user may be performed by associating a first identifier that indicates a terminal device of the first user with a second identifier that indicates a terminal device of the second user.

The present configuration makes it possible to provide information suitable for a user who uses each terminal device.

The association of the first user with the second user may be performed by associating a first identifier that indicates the first user with a second identifier that indicates the second user.

The present configuration makes it possible to provide information suitable for each user.

Evaluation data regarding each evaluation object among a plurality of evaluation objects may be generated based on a number of access to each evaluation object in a terminal device of each of the plurality of users.

The present configuration eliminates the need of the user to input evaluation values explicitly.

The evaluation data regarding each evaluation object among the plurality of evaluation objects may be generated based on evaluation inputted by each of the plurality of users in a terminal device of each user.

The present configuration allows the user to input the evaluation values explicitly, and makes it possible to provide information that matches actual feeling of the user better.

Furthermore, the information providing method according to the present disclosure includes the following: an information providing method in an information providing system for providing a terminal device of a user with object information via a network based on information from the terminal device of the user, the object information corresponding to preference of the user, the method comprising: receiving evaluation data of regarding a plurality of evaluation objects, from a terminal device of each of a plurality of users via the network; associating a first user among the plurality of users with a second user having an evaluation tendency similar to evaluation data of the first user; providing a terminal device of the first user via the network with first object information regarding a first evaluation object, the first evaluation object having been used by the second user and having not been used by the first user; receiving first preference information regarding preference of the plurality of users, from the terminal device of each of the plurality of users via the network; providing the terminal device of the first user with the first preference information via the network; receiving second preference information from the terminal device of the first user via the network, the second preference information being selected from among the first preference information by the terminal device of the first user as preference information that corresponds preference of the first user; associating a third user who provides the second preference information with the first user and the second user t; and providing the terminal device of the first user via the network with second object information regarding a second evaluation object, the second evaluation object having been used by the third user and having not been used by the first user, in addition to the first object information regarding the first evaluation object having been used by the second user and having not been used by the first user.

The present configuration not only provides the targeted user with object information of another user automatically selected by the system, but also allows the targeted user to select, as a similar user, another user having preference information that attracts an interest of the targeted user based on preference information inputted by a plurality of users from their respective terminal devices.

Furthermore, a number of the third user may be plural.

The present configuration, which allows selection of a plurality of users at a time as similar users, makes it possible to simplify processing by the user.

Furthermore, the information providing method according to the present disclosure includes the following: an information providing method in an information providing system for displaying object information that suits corresponds of a user of a terminal device on a display of the terminal device based on information from the terminal device, the method causing a computer of the terminal device to: input evaluation data about regarding a plurality of evaluation objects evaluated by each of a plurality of users into a terminal device of a first user among the plurality of users from a cloud server via a network; associate the first user with a second user who has an evaluation tendency similar to evaluation data of the first user; input first object information from the cloud server into the terminal device and display the object information on the display of the terminal device, the first object information being regarding a first evaluation object having been used by the second user and having not been used by the first user; input preference information regarding preference of the plurality of users from the cloud server into the terminal device via the network and display the preference information on the display of the terminal device; receive user information that indicates a third user via the terminal device and associate the third user with the first user and the second user, the third user being selected as a user having preference information that corresponds preference of the first user from among the preference information; provide the cloud server with the user information that indicates the third user via the network; and input second object information from the cloud server into the terminal device via the network and display the second object information on the display of the terminal device, the second object information being regarding a second evaluation object having been used by the third user and having not been used by the first user, in addition to the first object information regarding the first evaluation object having been used by the second user and having not been used by the first user.

The present configuration makes it possible to provide an information providing method that not only provides object information about another user automatically selected by the system, but also allows a targeted user to select, as a similar user, another user whom the targeted user is interested in.

Furthermore, the information providing method according to the present disclosure includes the following: an information providing method in an information providing system for displaying object information that corresponds preference of a user of a terminal device on a display of the terminal device based on information from the terminal device, the method causing a computer of the terminal device to: input evaluation data regarding a plurality of evaluation objects evaluated by each of a plurality of users into a terminal device of a first user among the plurality of users from a cloud server via a network; associate the first user with a second user who has an evaluation tendency similar to evaluation data of the first user; input first object information from the cloud server into the terminal device and display the first object information on the display of the terminal device, the first object information being regarding a first evaluation object having been used by the second user and having not been used by the first user; input first preference information from the cloud server into the terminal device via the network and display the first preference information on the display of the terminal device, the first preference information being regarding preference of the plurality of users; receive second preference information via the terminal device and provide the cloud server with the second preference information via the network, the second preference information being selected as preference information that corresponds preference of the first user from among the first preference information; receive user information that indicates a third user who selects the second preference information via the terminal device, and the third user with the first user and the second user; and input second object information from the cloud server into the terminal device via the network and display the second object information on the display of the terminal device, the second object information being regarding a second evaluation object having been used by the third user and having not been used by the first user, in addition to the first object information regarding the first evaluation object having been used by the second user and having not been used by the first user.

The present configuration not only provides object information about a user automatically selected by the system, but also allows the targeted user to select, as a similar user, another user having preference information that attracts an interest of the targeted user based on preference information inputted by a plurality of users from their respective terminal devices.

Furthermore, the information providing device according to the present disclosure is an information providing device for displaying object information that corresponds preference of a user, the device comprising: a display for displaying the object information; a communicating section for receiving evaluation data regarding a plurality of evaluation objects evaluated by each of a plurality of users from a cloud server via a network; and a controller configured to: associate a first user among the plurality of users with a second user having an evaluation tendency similar to evaluation data of the first user, display, on the display, first object information regarding a first evaluation object having been used by the second user and having not been used by the first user, receive preference information regarding preference of the plurality of users using the communicating section from the cloud server via the network, display the preference information regarding the preference of the plurality of users on the display, receive user information that indicates a third user selected as a user having preference information that corresponds preference of the first user from among the preference information, and associate the third user with the first user and the second user, and display, on the display, second object information regarding a second evaluation object having been used by the third user and having not been used by the first user, in addition to the first object information regarding the first evaluation object having been used by the second user and having not been used by the first user.

The present configuration makes it possible to provide an information providing device that not only provides object information about another user automatically selected by the system, but also allows a targeted user to select, as a similar user, another user whom the targeted user is interested in.

Furthermore, the information providing device described above further includes a storing section, wherein the controller receives evaluation data about a plurality of evaluation objects evaluated by each of the plurality of users at a first timing from the cloud server via the network and stores the received evaluation data in the storage, receives preference information regarding preference of the plurality of users at a second timing from the cloud server via the network and stores the received preference information in the storage, selects the first object information regarding the first evaluation object having been used by the second user and having not been used by the first user, using the storage, and displays the selected first object information on the display, and selects the second object information regarding the second evaluation object having been used by the third user and having not been used by the first user, using the storage, and displays the selected second object information on the display.

The present configuration makes it possible to provide an information providing device that allows a targeted user to select, as a similar user, another user whom the targeted user is interested in even when the information providing device, such as a terminal device, is temporarily disconnected to a cloud server.

Furthermore, the information providing device according to the present disclosure is an information providing device for displaying object information that suits preference of a user, the device comprising: a display for displaying the object information; a communicating section for receiving evaluation data regarding a plurality of evaluation objects evaluated by each of a plurality of users from a cloud server via a network; and a controller configured to: associate a first user among the plurality of users with a second user having an evaluation tendency similar to evaluation data of the first user, display, on the display, first object information regarding a first evaluation object having been used by the second user and having not been used by the first user, receive first preference information regarding preference of the plurality of users using the communicating section from the cloud server via the network, display the first preference information regarding the preference of the plurality of users on the display, receive second preference information selected as preference information that s corresponds preference of the first user from among the first preference information, associate a third user who selects the second preference information with the first user and the second user, and display, on the display, second object information regarding a second evaluation object having been used by the third user and having not been used by the first user, in addition to the first object information regarding the first evaluation object having been used by the second user and having not been used by the first user.

The present configuration makes it possible to provide an information providing device that not only provides object information about another user automatically selected by the system, but also allows the targeted user to select, as a similar user, another user having preference information that attracts an interest of the targeted user based on preference information inputted by a plurality of users from their respective terminal devices.

Furthermore, the information providing device described above further includes a storing section, wherein the controller receives evaluation data about a plurality of evaluation objects evaluated by each of the plurality of users at a first timing from the cloud server via the network and stores the received evaluation data in the storing section, receives the first preference information regarding the preference of the plurality of users at a second timing from the cloud server via the network and stores the received first preference information in the storing section, selects the first object information regarding the first evaluation object having been used by the second user and having not been used by the first user, using the storage, and displays the selected first object information on the display, and selects the second object information regarding the second evaluation object having been used by the third user and having not been used by the first user, using the storage, and displays the selected second object information on the display.

The present configuration allows the targeted user to select, as a similar user, another user having preference information that attracts an interest of the targeted user based on preference information inputted by a plurality of users from their respective terminal devices even when the information providing device, such as a terminal device, is temporarily disconnected to the cloud server.

Every exemplary embodiment described below shows one specific example of the present disclosure. A numerical value, shape, component, step, step sequence, and the like described in the following exemplary embodiments are an example, and are not intended to limit the present disclosure. Among the components in the following exemplary embodiments, a component that is not described in an independent claim showing the most generic concept is described as an optional component. In all the exemplary embodiments, it is possible to combine content of each of the exemplary embodiments.

(Overview of the Service to Provide)

Figure 1B:
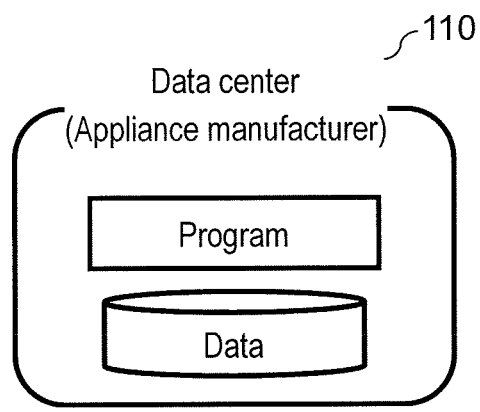
Figure 1C:
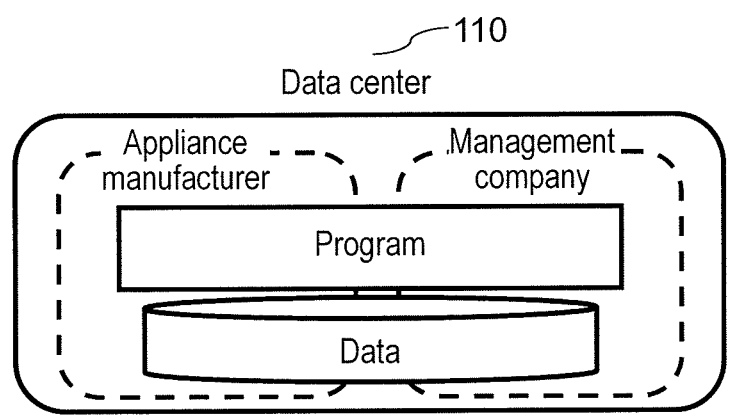

FIGS. 1(A) to 1(C) illustrate an overall configuration of an information providing system according to exemplary embodiments of the present disclosure.

Group 100 is, for example, a company, an organization, a family, or the like. Group 100 may be a building, a public facility, a house, or the like. Group 100 may be a vehicle (automobile, airplane, ship, train, or the like), a plant (electric power, machine, steel, or the like), or the like. Group 100 may be on any scale. Group 100 includes appliance A and appliance B included in appliance group 101, and home gateway 102. Appliance group 101 may include appliances connectable to the Internet (for example, smart phone, personal computer, television set, or the like). Appliance group 101 may include appliances unconnectable to the Internet in themselves (for example, illumination, washing machine, refrigerator, or the like). Appliance group 101 may include appliances unconnectable to the Internet in themselves, the appliances becoming connectable to the Internet via an appliance connectable to the Internet or via home gateway 102. The appliance connectable to the Internet and home gateway 102 may always be connected to the Internet, or may be connected to the Internet regularly or irregularly. The appliance unconnectable to the Internet may become connectable to the Internet by the installation of a device connectable to the Internet. Group 100 includes user 10 who uses appliance group 101. User 10 uses appliance A and appliance B included in appliance group 101 as necessary. Group 100 further includes home gateway 102. Home gateway 102 performs relay processing for connecting, to the Internet, appliances included in appliance group 101, the appliances being unconnectable to the Internet. The relay processing includes, for example, interconversion of protocols, interconversion of communication modes, and interconversion of signals. Home gateway 102 may not relay all communications (data etc.) to the Internet, but may relay only a portion of communications. For example, from among data to be uploaded from appliance group 101 to data center 110 or the like, home gateway 102 may determine which data to upload and which data not to upload, and may select data to relay. The above description is also applied to appliance control information provided from data center 110 or the like to appliance group 101. For example, home gateway 102 may determine which control information to notify appliance group 101 and which control information not to notify appliance group 101. Home gateway 102 may then select control information to relay. At this time, home gateway 102 may determine whether to relay the information depending on content of the data to upload and on content of the control information to notify. Home gateway 102 may determine not to relay the information until the accumulation of data or control information of a certain period of time or of a certain quantity. Alternatively, home gateway 102 may determine to relay the information at a certain time, and not to relay the information at another time. Home gateway 102 may determine whether to relay the information depending on information from a sensor installed in group 100. Home gateway 102 may determine whether to relay the information depending on an instruction from data center 110 or the like. Furthermore, home gateway 102 may not only determine whether to relay the information, but also store, for example, part of data uploaded from appliance group 101. The data stored in home gateway 102 includes the following information. For example, information regarding privacy of user 10, confidential information or secret information about group 100, information regarding security, safety, and the like. Only home gateway 102 may store the information. The information may be processed and then uploaded to data center 110.

Data center 110 includes program 111 and data 112. Program 111 is a program that cooperates with various appliances via the Internet. Program 111 mainly manages huge data (big data) or the like that is difficult to handle with a general database management tool or the like. Program 111 also provides various services to an appliance outside of data center 110 (appliance A, appliance B, terminal 120), and to service provider 130. Data 112 includes data managed by program 111, data received from appliance A, appliance B, terminal 120, service provider 130, and the like, or data calculated by program 111. Data 112 stored in a storage device (not illustrated) is included in data center 110.

Data center 110 is not limited to a company that performs only management of data, and management and operation of a computer that executes program 111. For example, when an appliance manufacturer that develops and manufactures one appliance out of appliance group 101 performs management such as data management and computer management, the appliance manufacturer corresponds to data center 110 (FIG. 1(B)). Data center 110 is not necessarily one company. For example, when a plurality of appliance manufacturers exercise in collaboration or on a job-sharing basis, or one or more appliance manufacturers and other management companies exercise in collaboration or on a job-sharing basis management of data, and management and operation of a computer, all or part of the management and operation corresponds to data center 110 (FIG. 1(C)).

Service provider 130 includes program 131 and data 132. Program 131 is a program that cooperates with various appliances via the Internet. Program 131 uses data 112 stored in data center 110 and data 132 to provide terminal 120 with various services. Program 131 provides data center 110 with data obtained from terminal 120, data calculated by program 131, and data 132. Program 131 provides appliance A and appliance B included in appliance group 101 with information, or controls appliance A and appliance B via program 111 in data center 110. Data 132 is included in service provider 130 in a state of being stored in a storage device (not illustrated). Service provider 130 may not include data 132. In this case, service provider 130 acquires various data from data center 110 as necessary.

In the above-described information providing system, home gateway 102 is not essential. For example, when data center 110 performs all the data management, home gateway 102 is unnecessary. Home gateway 102 is also unnecessary when an appliance unconnectable to the Internet in itself does not exist, such as when all the appliances at home are connected to the Internet. Home gateway 102 is also unnecessary when all the appliances unconnectable to the Internet are connected to the Internet via an appliance connectable to the Internet. Home gateway 102 is also unnecessary as an appliance when functions of home gateway 102 are mounted in an appliance connectable to the Internet.

Terminal 120 is an appliance used by user 20. Terminal 120 receives a service provided by program 131 and displays on a screen of terminal 120 as necessary. Terminal 120 receives an instruction from user 20, or operates according to an event generated in terminal 120, and then notifies data to program 131. Terminal 120 may receive a service provided by program 111, and may display on the screen of terminal 120 as necessary. Terminal 120 may receive an instruction from user 20, or may operate according to an event generated in terminal 120 and notify data to program 111.

User 10 and user 20 may be different persons, may be an identical person, and may be one person or a plurality of persons. Appliance A and appliance B included in appliance group 101, and terminal 120 may be used by either of user 10 or user 20. Alternatively, without being used by anybody, each of appliance A, appliance B, and terminal 120 may include a sensor and operate autonomously according to data from each sensor, or to data received from program 111 or program 131.

Next, the following describes information flow in the above-described information providing system.

First, appliance A or appliance B included in appliance group 101 in group 100 transmits each pieces of log information to program 111 in data center 110. Program 111 accumulates the log information about appliance A or appliance B as data 112 (step (a) in FIG. 1(A)). The log information refers to information such as history information about operation of appliance A or appliance B performed by user 10, and sensor information from various sensors. Examples of the log information include: for example, a viewing history of a television; recording reservation information of a recorder; operation date and time, amount of laundry, and operation mode of a washing machine; open/close date and time, number of times of open/close, and amount of used power of a refrigerator; and usage date and time, usage course, cooking time, and usage recipe of a microwave oven or a bread machine. The log information however refers not only to the above-described information but also to all information that can be acquired from every appliance. The log information is directly provided to program 111 from appliance group 101 themselves via the Internet in some cases. The log information may be accumulated from appliance group 101 into home gateway 102 temporarily, and may then be provided from home gateway 102 to program 111.

Next, program 111 in data center 110 organizes the log information accumulated as data 112 into information that suits a service to be provided to service provider 130, and provides the information to program 131 in service provider 130 in a fixed unit. The fixed unit may be a unit in which the information accumulated by data center 110 can be organized and provided to service provider 130. The fixed unit may also be a unit required by service provider 130. The unit in which the log information is provided to service provider 130 has been described as a fixed unit, but the unit does not need to be fixed. That is, an amount of information to be provided may vary according to a situation. The above-described log information is stored as data 132 in service provider 130 as necessary (step (e) in FIG. 1(A)).

Then, program 131 in service provider 130 provides terminal 120 that user 20 possesses with the information provided from data center 110. The information to be provided to terminal 120 may be information obtained by organizing the information provided from data center 110 into information that suits the service to be provided to user 20. The information to be provided to terminal 120 may be information generated by program 131 (step (b) in FIG. 1(A)).

Terminal 120 organizes the information provided from program 131 so that the information can be displayed on a screen. Terminal 120 notifies user 20 of the information provided from program 131 by displaying the information on the screen. Terminal 120 further displays a command that user 20 can use on the same screen or on another screen. When user 20 inputs something regarding the display, terminal 120 notifies program 131 of content inputted by user 20 and an instruction using a command (step (c) in FIG. 1(A)). The above-described command includes an instruction for start-up and closing, and settings of an operation mode for appliance A and appliance B included in appliance group 101. The above-described command is, for example, an instruction for power on/off and channel designation of a television set, and an instruction for recording reservation and instruction for reproduction start/stop of a recorder. The above-described command is setting of an operation mode and instruction for washing start for a washing machine. The above-described command is an instruction for power on/off, operation mode setting, temperature setting, wind amount setting, wind direction setting, etc. for an air-conditioner. The above-described command however includes all commands that can be set not only to these appliances but to every appliance.

Program 131 in service provider 130 organizes the notification and log information received from terminal 120 into information that suits the service to be provided to user 10, data center 110, and appliance A and appliance B included in appliance group 101. Program 131 provides program 111 in data center 110 with the organized information (step (f) in FIG. 1(A)). When program 131 has information to provide to appliance A and appliance B included in appliance group 101, program 131 provides the information to appliance A and appliance B included in appliance group 101 via data center 110 (steps (d), (f) in FIG. 1(A)). When program 131 in service provider 130 has information to provide to appliance A and appliance B included in appliance group 101, program 131 may directly provide the information to appliance A and appliance B included in appliance group 101, not via data center 110.

The information may be provided to all of appliance A and appliance B included in appliance group 101 in group 100, data center 110, and terminal 120. The information may be provided only to part of the above-described appliances. The notification and log information received from terminal 120 may be provided to terminal 120 again.

Program 111 in data center 110 organizes the information provided from appliance A and appliance B included in appliance group 101, service provider 130, terminal 120, and the like. Program 111 in data center 110 then provides the organized information to appliance A and appliance B (step (d) in FIG. 1(A)).

Patterns of the information providing system in the exemplary embodiments of the present disclosure are not limited to these examples.

The above-described information providing system has a function of accumulating each piece of log information received from appliance A and appliance B included in appliance group 101 in group 100. The above-described information providing system further has a function of organizing the accumulated log information into information that suits the service to be provided to a user. The above-described information providing system further has a function of providing a terminal that user 20 possesses with the accumulated log information and the organized information. The information providing system can be classified into, for example, the following patterns according to where these functions are included. Patterns that allow achievement of the techniques described in the present disclosure, however, are not limited to these patterns.

(Service Pattern 1: In-House Service Type)

FIG. 2 illustrates an overall configuration of service pattern 1 (in-house service type). In the present pattern, data center 110 acquires information from group 100 (home) and provides service directly to terminal 120. In the present pattern, data center 110 has a function of service provider 130. That is, data center 110 manages information from group 100 (home). Based on the information from group 100, data center 110 provides a service to terminal 120 (user 20). Therefore, service provider 130 does not exist.

In the present pattern, data center 110 manages program 113 and data 114. Data center 110 uses program 113 to accumulate log information of appliance A and appliance B included in appliance group 101 as data 114 (step (a) in FIG. 2). Data center 110 uses program 113 to provide service to terminal 120 (step (b) in FIG. 2). Data center 110 further organizes the information provided from terminal 120 (step (c) in FIG. 2). Data center 110 further provides service to appliance A and appliance B included in appliance group 101 (step (d) in FIG. 2).

The above description, in which program 113 in data center 110 performs the above-described processing, is not restrictive. There may be a plurality of programs 113. For example, an individual program may be used for each of the above-described processing. A program that communicates with appliance A and appliance B included in appliance group 101, and a program that communicates with terminal 120 may exist separately.

(Service Pattern 2: Storage Service Type)

Figure 3:
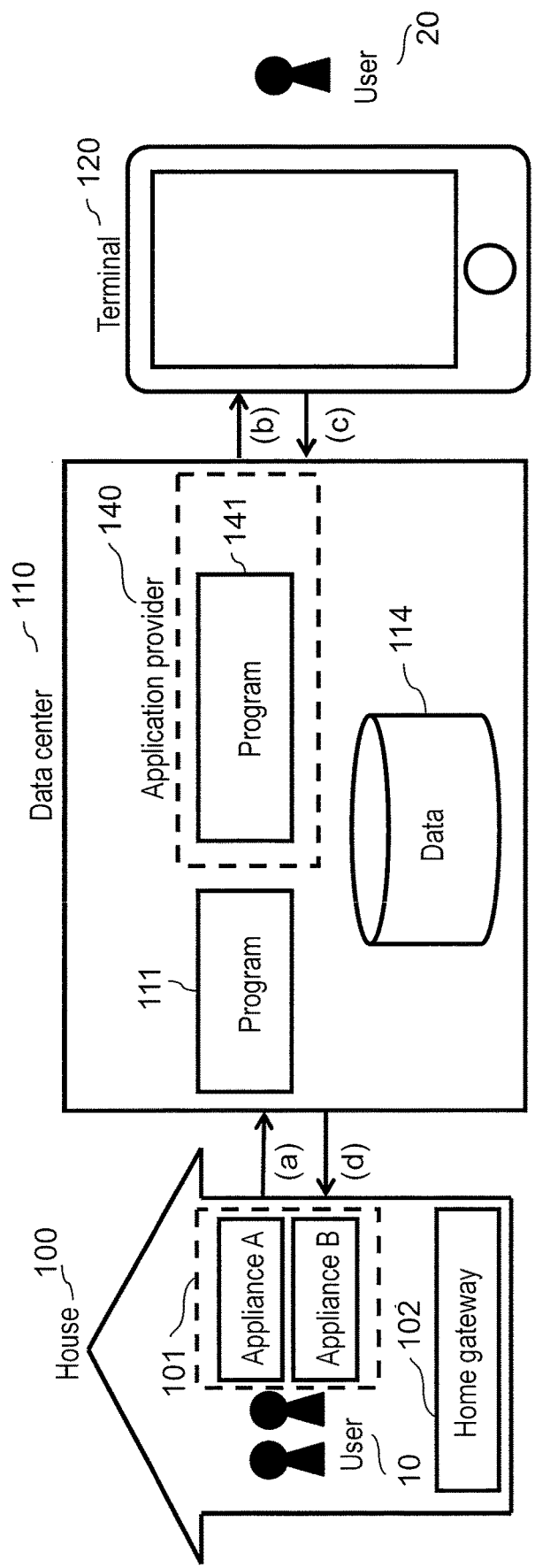
FIG. 3 illustrates an overall configuration of service pattern 2 of the information providing system according to the present disclosure.

FIG. 3 illustrates an overall configuration of service pattern 2 (storage service type). In the present pattern, a function of service provider 130 in FIG. 1(A) operates in data center 110. In the present pattern, data center 110 includes application provider 140 that has a function of service provider 130. Application provider 140 is run by a company other than a company that runs data center 110. This makes it possible to allow different companies to perform data management and service provision, respectively, while providing application provider 140 with high-speed data access. Application provider 140 present in data center 110 makes it possible to exchange data between data center 110 and application provider 140 at a higher speed. Since the data exchange does not go through an external network, it is also possible to reduce costs necessary for the external network.

Data center 110 manages information to be exchanged with group 100. Data center 110 also provides an environment that allows program 141 in application provider 140 to access data 114. Application provider 140 uses program 141 to provide terminal 120 (user 20) with service based on data 114 managed by data center 110. Therefore, service provider 130 does not exist. Data center 110 also manages data generated by program 141 as data 114.

Program 141 in application provider 140 may operate in a computer installed in data center 110, the computer being managed by application provider 140. A company that runs data center 110 may prepare a computer, and application provider 140 may install program 141 including an operating system (OS) and middleware into the computer. The computer prepared by the company that runs data center 110 may be a real computer or a virtual computer.

Data center 110 provides application provider 140 with an environment for access to data 114. The access to data 114 may be made via a network. Data 114 may be shared as a virtual disk in a virtual computer, and the access may be made as disk access. Program 141 in application provider 140 accesses data 114, performs various processing, and provides service.

(Service Pattern 3: Web Application Type)

Figure 4:
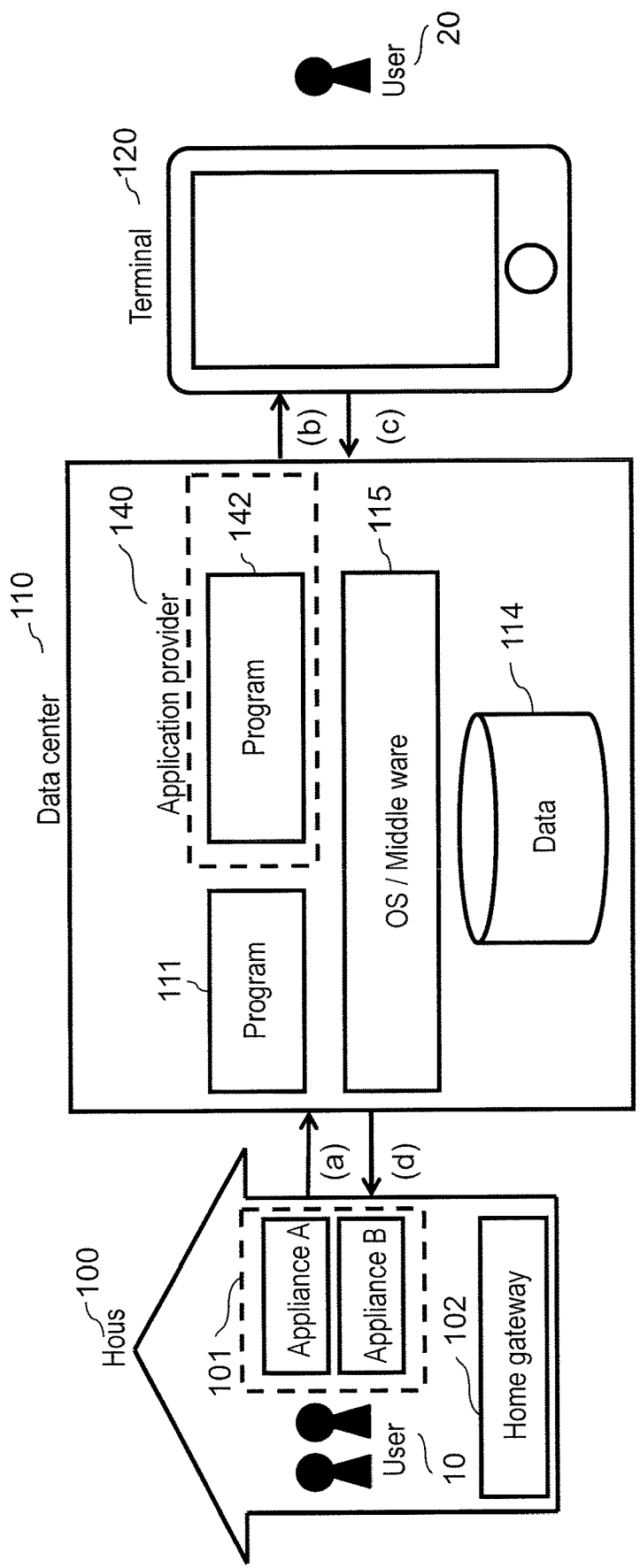
FIG. 4 illustrates an overall configuration of service pattern 3 of the information providing system according to the present disclosure.

FIG. 4 illustrates an overall configuration of service pattern 3 (Web application type). The present pattern is a variation of service pattern 2 (storage service type) in FIG. 3. In the present pattern, data center 110 provides application provider 140 with not only space for installing a real computer and the computer, but also an operating system (OS) and middleware. This eliminates the need of application provider 140 to prepare the OS and middleware. This also allows application provider 140 to use data 114 managed by data center 110 more easily. This allows data center 110 to provide data processed using the OS and middleware, and to restrict access to data more flexibly.

Data center 110 includes program 111, data 114, OS/middleware 115, and program 142 provided by application provider 140. OS/middleware 115 provides program 111 and program 142 with an environment that allows execution of program 111 and program 142. The environment that allows execution of program 111 and program 142 includes a library for accessing data 114. During the access to data 114, program 111 and program 142 use the library provided by OS/middleware 115 to access data 114.

(Service Pattern 4: Terminal Type)

Figure 5:
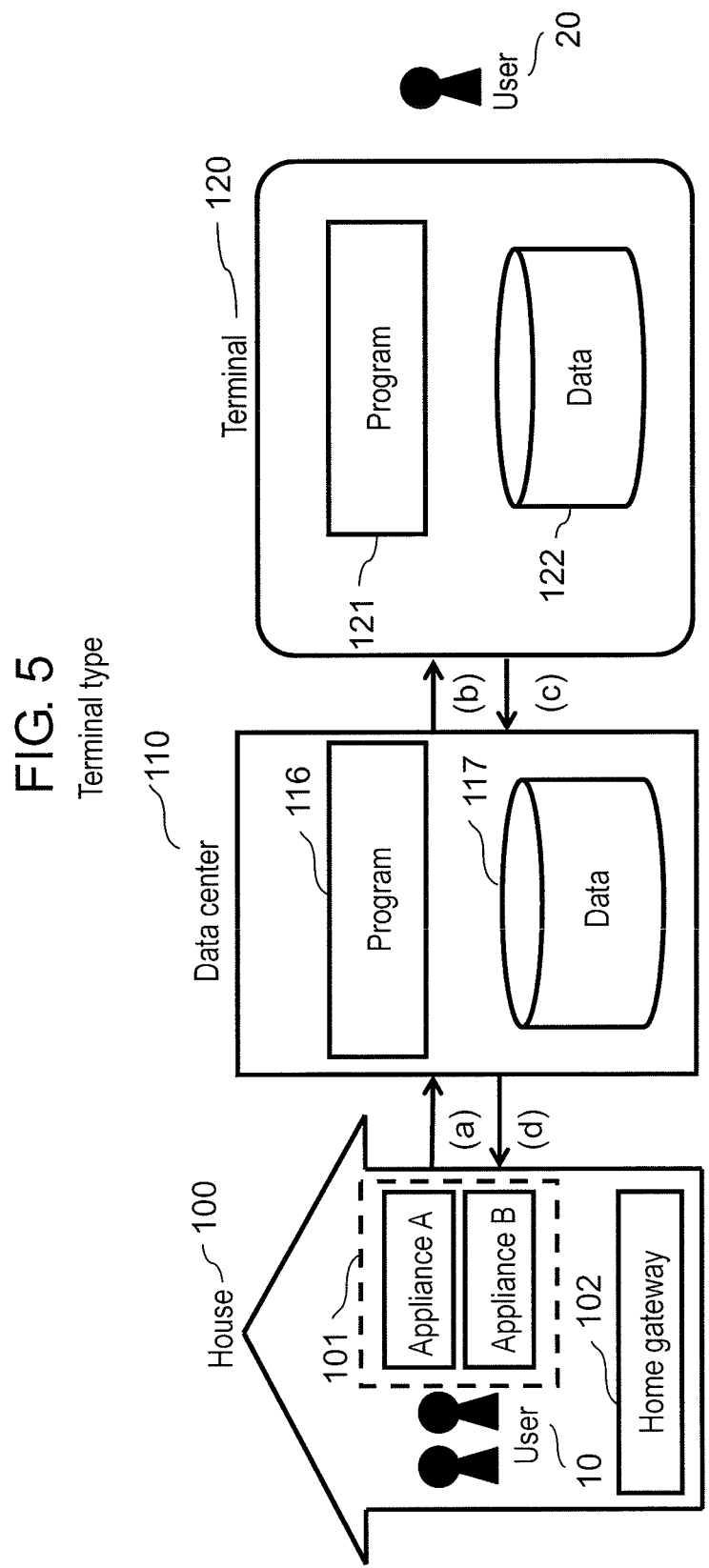
FIG. 5 illustrates an overall configuration of service pattern 4 of the information providing system according to the present disclosure.

FIG. 5 illustrates an overall configuration of service pattern 4 (terminal type). In the present pattern, a function of service provider 130 in FIG. 1(A) operates in terminal 120. In the present pattern, terminal 120 includes program 121 that has a function of service provider 130. That is, program 121 in terminal 120 communicates directly with data center 110, and provides service directly to user 20 in accordance with data obtained from data center 110. Therefore, service provider 130 does not exist. In the present pattern, data center 110 includes program 116 and data 117. Terminal 120 includes program 121 and data 122. Program 116 manages data received from appliance A and appliance B included in appliance group 101. Program 116 organizes the data received from appliance A and appliance B included in appliance group 101. Program 116 also provides the received data and the organized data to program 121 in terminal 120. Data 117 includes the data received from appliance A and appliance B included in appliance group 101. Data 117 further includes data such as the data organized by program 116 and the data received from terminal 120. Program 121 uses data 117 stored in data center 110 and data 122 to provide user 20 with service. Data 122 stores the data received from data center 110, the data organized by program 121, and the data inputted from user 20. Data 122 further stores other programs in terminal 120, data from a sensor installed in terminal 120, and other information.

Program 121 may be provided by service provider 130, and may be provided by a terminal manufacturer who develops and manufactures terminal 120. Program 121 may be provided by data center 110, and may be provided by an appliance manufacturer who develops and manufactures one appliance among appliance group 101. Alternatively, program 121 may be provided by another company. Program 121 may be provided by user 10 who uses appliance group 101, and may be provided by user 20 who uses terminal 120. Program 121 may be provided by other users or developers.

Data 122 may store all or part of the data stored in data 117. For example, all of the data stored in data 117 may be recorded in a storage device of terminal 120 before shipment of terminal 120. Data 122 may record part of the data stored in data 117. Data 122 may record only log information during a certain period of time. The data may be downloaded via a network and recorded at a time of initial start-up of program 121. While user 20 is using terminal 120, the data may be downloaded and recorded in the background. The data may be downloaded and recorded while terminal 120 is operating but user 20 is not using terminal 120. When program 121 is installed in terminal 120, the data may be installed together. The data may be stored in terminal 120 via a recording media, or data recorded in the recording media may be used as it is.

Data 122 may store data generated by each managing section in terminal 120 together with data copied from data 117. When a change is made in data 122, terminal 120 may notify the change to data center 110 and may cause data 117 in data center 110 to reflect the change in data 122. In this way, when data 122 stores all or part of data 117, program 121 can provide user 20 with a service even in a case where terminal 120 cannot access data center 110.

When a change, addition, or deletion is made in data 117, program 121 may receive the notification from program 116 and reflect the change etc. made in data 117 on data 122.

Program 121 may switch between using the data of data 122 and using the data of data 117 in data center 110 depending on a state of access to data center 110. For example, when access to data center 110 can be made at a high speed, program 121 uses the data of data 117 in data center 110. On the other hand, when access to data center 110 is not available or when access cannot be made at a high speed, a method of switching is available such as using data 122. Besides this method, program 121 may determine which of data 117 and data 122 to use depending on an amount of data exchanged with data center 110, and on date and time when data to be used is updated. Alternatively, another method may be used.

First Exemplary Embodiment

The information providing system according to a first exemplary embodiment of the present disclosure is a system for selecting information that suits preference of a user from among a large amount of information, the system providing the user with information that the user has not used yet from among the information selected by the system. Specifically, first, the system extracts a plurality of similar users who have preference similar to preference of the user based on user evaluation values for a restaurant or grocery store registered in a database. The system then selects a restaurant or grocery store on which the similar users set high values. Next, the system provides the user with information about a store that the user has not used yet from among the restaurant or grocery store selected by the system. In addition, the system also provides the user with information regarding dissimilar users who are not extracted as similar users. The user selects another user (additional user) who may be added to the similar users from among the information-provided dissimilar users. The present system adds the additional user selected by the user to the similar users, extracts a store that suits preference of the user again, and provides the user with information about the store. In this system, the user inputs an evaluation value when the user visits or uses the store. This makes it possible to provide the user who receives information about the store selected by the system with means for modifying the selection. This method can improve the accuracy with which the information provided to the user suits the preference of the user.

The information providing system according to the first exemplary embodiment of the present disclosure further uses log information obtained from an appliance used by the user to determine the preference of the user. This makes it possible to select a store that better suits the preference of the user by determining whether a feature of each store suits the preference of the user. This also saves the user's time and effort to input his or her own preference information into the system. Furthermore, this is considered to make it possible to extract preference information that the user himself or herself is not aware of from the log information.

<System Configuration>

The information providing system according to the first exemplary embodiment of the present disclosure is an information providing system illustrated in FIG. 1. The information providing system includes group 100 (house), data center 110, terminal 120, and service provider 130. Each component and each functional outline have been described previously. Details of each component will be described below.

Figure 6:
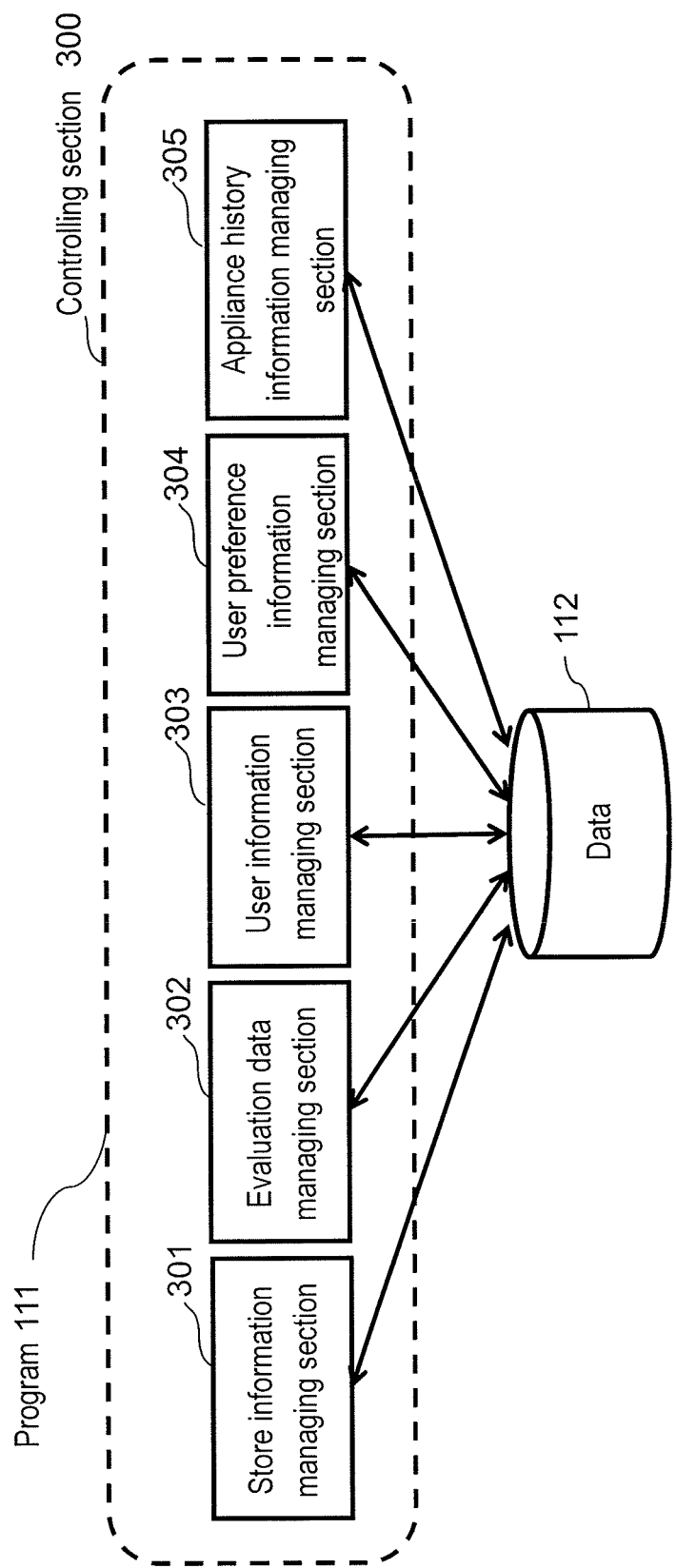
FIG. 6 illustrates a configuration of program 111 that operates in data center 110 of the information providing system according to a first exemplary embodiment of the present disclosure.

FIG. 6 is a configuration diagram of program 111 that operates in data center 110 of the information providing system according to the first exemplary embodiment of the present disclosure. For convenience of description, FIG. 6 also illustrates data 112 together.

In FIG. 6, program 111 in data center 110 includes controlling section 300. Controlling section 300 includes store information managing section 301, evaluation data managing section 302, user information managing section 303, user preference information managing section 304, and appliance history information managing section 305.

Store information managing section 301 is a managing section that manages data regarding store information included in data 112 in data center 110. The data managed by store information managing section 301 includes a store ID for identifying the store, a name of the store, an address of the store, an icon for a user to easily identify the store, a category of the store for showing what kind of store the store is. An individual value of the store ID is set for each store. The category of the store refers to, for example, in a case of a restaurant, a type of food served at the store, such as "Japanese food", "Western food", "Chinese food", "French food", and "Italian food". The category of the store refers to a major food material served at the store, such as "bread", "vegetable", "beef", "fish", "pasta", "fruit", and "cake". The category of the store refers to a cooking method of a main menu of the store, such as "roast", "deep-fry", "boil", "raw", and "stir-fry". The category of the store further refers to a preference tendency of the food served at the store, such as "sweet", "bitter", "hot", "sour", and "fatty". The category of the store refers to information regarding an allergy-causing substance to which the store pays attention, such as "for those with egg allergies", "for those with wheat allergies", "for those with shrimp allergies", "for those with crab allergies", "for those with peanut allergies", or "egg-free", "wheat-free". The category of the store may be a combination of the above pieces of category information.

User 10 and user 20 input the store information about each store using an interface provided by store information managing section 301. User 10 and user 20 check whether the store visited or used has been registered in data 112. When the check result shows that the store has not been registered, user 10 and user 20 register the information about the store using the interface provided by store information managing section 301. When the store has been registered, user 10 and user 20 refer to the information about the store. When the information referred to is old and needs to be modified, user 10 and user 20 modify the information about the store using the interface provided by store information managing section 301. When the visited store is already closed, user 10 and user 20 delete the store information about the closed store using the interface provided by store information managing section 301.

In response to a request from user 10, user 20, controlling section 300, another managing section, or another appliance, store information managing section 301 searches data managed by store information managing section 301 and outputs the search results based on a name, address, and category of the specified store. Store information managing section 301 also has a function of outputting the store information corresponding to the specified store ID.

Store information managing section 301 may perform each processing of registration, modification, and deletion of store information just as requested, the processing being requested by user 10 and/or user 20. Store information managing section 301 may perform the processing, only after store information managing section 301 inquires of an administrator who manages store information whether the processing may be performed and after the administrator determines that the processing may be performed. Store information managing section 301 may perform the processing, only after appointment of a plurality of administrators, and after consultation by the plurality of administrators or agreement by the administrators of equal to or greater than a certain number. Part or all of the administrators may be users. Alternatively, the processing may be performed in response to a request for similar processing from a plurality of users. A record may be made about who has performed what kind of processing when. The record may be configured so that user 10 and user 20 can see the history. The record may be configured so that a user other than the user who has performed the processing can evaluate a history corresponding to each processing. Depending on the evaluation, registration processing, modification processing, and deletion processing of the store information may be prohibited. Conversely, depending on the evaluation, the check by the administrator may be made unnecessary. When deletion of the store information is requested, store information managing section 301 may record only information that the store has been closed, and may not delete the store information itself. Alternatively, store information managing section 301 may prohibit registration, modification, and deletion of the store information by users such as user 10 and user 20, and may allow only reference of the store information. In this case, only the administrator who manages the store information can perform each processing of registration, modification, and deletion.

Evaluation data managing section 302 manages evaluation data (evaluation value) set by user 10 and user 20 for each store managed by store information managing section 301. The evaluation data is included in data 112. Evaluation data managing section 302 associates a store ID for identifying the store and a user ID for identifying the user with the evaluation value for management. That is, evaluation data managing section 302 manages how the user indicated by the user ID evaluates the store indicated by the store ID.

When the user has not evaluated the store yet, evaluation data managing section 302 manages to that effect. When the store has not been evaluated yet, an absence of the evaluation data may represent that the store has not been evaluated yet.

Evaluation data managing section 302 has an interface for adding and modifying the evaluation data. User 10 and user 20 request processing of addition and modification of the evaluation data from appliances such as appliance A and appliance B included in appliance group 101, or terminal 120, using the interface of evaluation data managing section 302. Evaluation data managing section 302 performs processing of addition and modification of the evaluation data in response to the request from the user.

Evaluation data managing section 302 outputs the evaluation data managed by evaluation data managing section 302 in response to a request from user 10, user 20, controlling section 300, another managing section, or another appliance. At this time, for example, when a store ID and a user ID are specified, evaluation data managing section 302 outputs an evaluation value of a store indicated by the store ID, the evaluation value being set by a user indicated by the user ID. When only a store ID is specified, evaluation data managing section 302 outputs an evaluation value of a store indicated by the store ID, the evaluation value being set by all users. Similarly, when only a user ID is specified, evaluation data managing section 302 outputs an evaluation value of all stores, the evaluation value being set by a user indicated by the user ID. When a plurality of store IDs and a plurality of user IDs are specified, evaluation data managing section 302 outputs an evaluation value set for each of all combination of the store IDs and the user IDs.

Evaluation data managing section 302 may have an interface for deleting evaluation data. When specified store information managed by store information managing section 301 is deleted, or when closing of a specified store is registered, evaluation data managing section 302 may delete evaluation data regarding a store ID of the store. When a store is closed and store information of the closed store is not deleted, evaluation data managing section 302 may not delete evaluation data of the closed store. Evaluation data managing section 302 may prohibit change of the evaluation data of the closed store. The evaluation value may be set by a user, and may be generated from log information obtained from an appliance. Methods of generating evaluation data from log information include a method of using the following information that may be included in the log information. The information includes, for example, a number of times the user accesses information about the store, a number of times the user visits the store, and a number of times the user orders food served at the store. The information includes a number of times the user reserves and visits the store, a food material and recipe of the store, and a number of times the user uses a cooking method. The evaluation data may be generated by using only one piece of the aforementioned information. The evaluation data may be generated by using a plurality of pieces of the aforementioned information. At this time, the evaluation value may be set according to a number of times. The evaluation value may be set from a difference of a number of times from another user.

User information managing section 303 is a managing section that manages data regarding user information included in data 112. The data managed by user information managing section 303 includes a user ID for identifying a user, a name of the user, an address of the user, an age of the user, a gender of the user, and an appliance ID list for managing appliances that the user possesses. An individual value of the user ID is set for each user. The appliance ID list associates an appliance ID for identifying an appliance with a user ID of a user who possesses the appliance. The user ID may be a numerical value string or character string determined by the user. The user ID may be an identifier, such as a manufacturer's serial number, telephone number, and device-dependent number of a terminal device that the user uses. The user ID may be an ID randomly generated by the information providing system. Basically, one appliance is associated with one user. When a plurality of users use or manage an appliance, however, one appliance may be associated with a plurality of users.

User 10 and user 20 input their respective user information using an interface provided by user information managing section 303. User 10 and user 20 input the user information at a time of registration in the present system. When a change occurs in the user information registered by user 10 and user 20, each user requests modification of the user information from user information managing section 303. At a time of withdrawal from the present system, each user requests deletion of the user information from user information managing section 303.

In response to a request such as registration, modification, and deletion regarding user information via the interface, user information managing section 303 performs the request.

User preference information managing section 304 is a managing section that manages user preference information included in data 112, the user preference information being associated with the user. The data managed by user preference information managing section 304 includes a user ID for identifying the user and the preference information associated with the user. The user ID is a user ID managed by user information managing section 303, and is used for associating preference information with the user. The preference information is information similar to a store category managed by store information managing section 301. The preference information is information that shows what the user likes. The preference information includes, for example, a type of favorite food, such as "Japanese food", "Western food", "Chinese food", "French food", and "Italian food". The preference information includes a favorite food material, such as "bread", "vegetable", "beef", "fish", "pasta", "fruit", and "cake". The preference information includes a favorite cooking method, such as "roast", "deep-fry", "boil", "raw", and "stir-fry". The preference information includes a favorite food preference tendency, such as "sweet", "bitter", "hot", "sour", and "fatty". The preference information includes a type of favorite staple food, such as "boiled rice", "bread", and "noodle". The preference information includes information regarding an allergy-causing substance to which the store pays attention, such as "for those with egg allergies", "for those with wheat allergies", "for those with shrimp allergies", "for those with crab allergies", "for those with peanut allergies", or "egg-free", "wheat-free". From among these pieces of information, only one may be used as the preference information. Alternatively, a combination of a plurality of pieces of information selected from these pieces of information may be used as the preference information.

The preference information for each user is generated from history information managed by appliance history information managing section 305. For example, the preference information is determined from a use history of a cooking recipe used with a microwave oven, an IH cooking heater, a bread machine, etc. The preference information may be determined from an evaluation value for the recipe, etc. It is assumed that information regarding preference has been added in advance to the cooking recipe and a function of each appliance. This makes it possible to determine what kind of preference the user has from information about which recipe or function the user has used. Specifically, when the user often uses a recipe for a hot food, or when the user sets a high value on the recipe for a hot food, the "hot" preference information is set as the user's preference information. At this time, the "hot" preference information has been added to the recipe of the hot food in advance. Another method is to determine whether a favorite staple food is "boiled rice" or "bread", and to set the determined staple food as preference information by calculating a difference in frequency of use between a rice cooker and a bread machine from history information about the rice cooker and history information about the bread machine. At this time, "boiled rice" preference information has been added to a rice cooking function of the rice cooker in advance. "Bread" preference information has been added to a bread baking function of the bread machine in advance. Another method is to determine a favorite cooking method and to set the determined cooking method as preference information from history information about a function used with a microwave oven and an IH cooking heater, the favorite cooking method including "roast", "deep-fry", "boil", and "stir-fry". The following information shows that the user purchases egg-free, allergy-free products and that the user does not purchase eggs at all, the information including a contents list of a refrigerator, a mail order use history, a credit card use history, a point card use history, and content of a receipt. In such a case, since the information shows that the user is allergenic to eggs, there is another method of setting preference information such as "egg-free". A shopping list of purchased products shows a production region of purchased rice, vegetable, and meat. Accordingly, this information may be set as preference information. For example, when the user purchases a lot of hard food, such as unpolished rice, root vegetables, and kelp, preference information of frequent hard menus can also be set. The shopping list and the contents list of a refrigerator show what the user purchases and what the user uses. Accordingly, it is also possible to guess a food menu cooked from the aforementioned food materials, and to set preference information corresponding to the guessed menu. The shopping list and the recipe show whether the user often eats beef, whether the user often eats pork, whether the user often eats chicken, and whether the user often eats fish. Accordingly, this information can also be set as preference information.

Preference information may be inputted from outside using an interface provided by user preference information managing section 304. For example, the user himself or herself may input his or her own preference information from appliances such as appliance A and appliance B included in appliance group 101, or terminal 120. Preference information may be inputted into the present system from another system. A combination of these input methods may be used. Alternatively, after automatic input to some extent by the system, the user himself or herself may modify the preference information inputted by the system via appliances such as appliance A and appliance B included in appliance group 101, or terminal 120.

Appliance history information managing section 305 is a managing section that manages data regarding an appliance history included in data 112. The data managed by appliance history information managing section 305 includes an appliance ID for identifying an appliance, an appliance type that shows a type of the appliance, and history information obtained from the appliance. The appliance type is a product type such as, for example, "television", "washing machine", "refrigerator", "microwave oven", and "bread machine". The history information is log information provided from each of appliance A and appliance B included in appliance group 101.

When user 10 purchases a new appliance, user 10 registers an appliance ID and appliance type of the new appliance into an appliance ID list of user information. At this time, appliance history information managing section 305 registers the appliance ID and appliance type of the new appliance. From this time, when history information is obtained from the appliance, appliance history information managing section 305 associates the history information with the appliance ID and the appliance type for management. At this time, appliance history information managing section 305 may generate the appliance ID, or an ID may be given to the appliance in advance to use the ID as the appliance ID.

Appliance history information managing section 305 has an interface for adding a new appliance and for registering an appliance history. Appliance A and appliance B included in appliance group 101 add history information using the interface of appliance history information managing section 305.

The appliance type refers to a product type, such as "television", for example, but the appliance type is not limited to this example. The appliance type may be determined according to arbitrary standards. For example, a television may be classified into appliance types such as "flat-screen television", "large television", "portable television", and "waterproof television" based on user's optional reference. At this time, the appliance type may be classified into a plurality of layers. Small product-types of "flat-screen television", "large television", "portable television", and "waterproof television" may be disposed under a large product-type "television". The appliance type may be a product number of the appliance instead of a product type. The history information may further include not only the log information that is an operation history of the appliance but also the following information. For example, the history information may include an inspection history, such as an inspection date and inspection item when the appliance is inspected, and an inspection result. The history information may further include a repair history such as a repair date when the appliance is repaired, an appliance situation, and a repair item. The history information may further include another history information regarding the appliance such as an owner of the appliance and the user's history.

Figure 7:
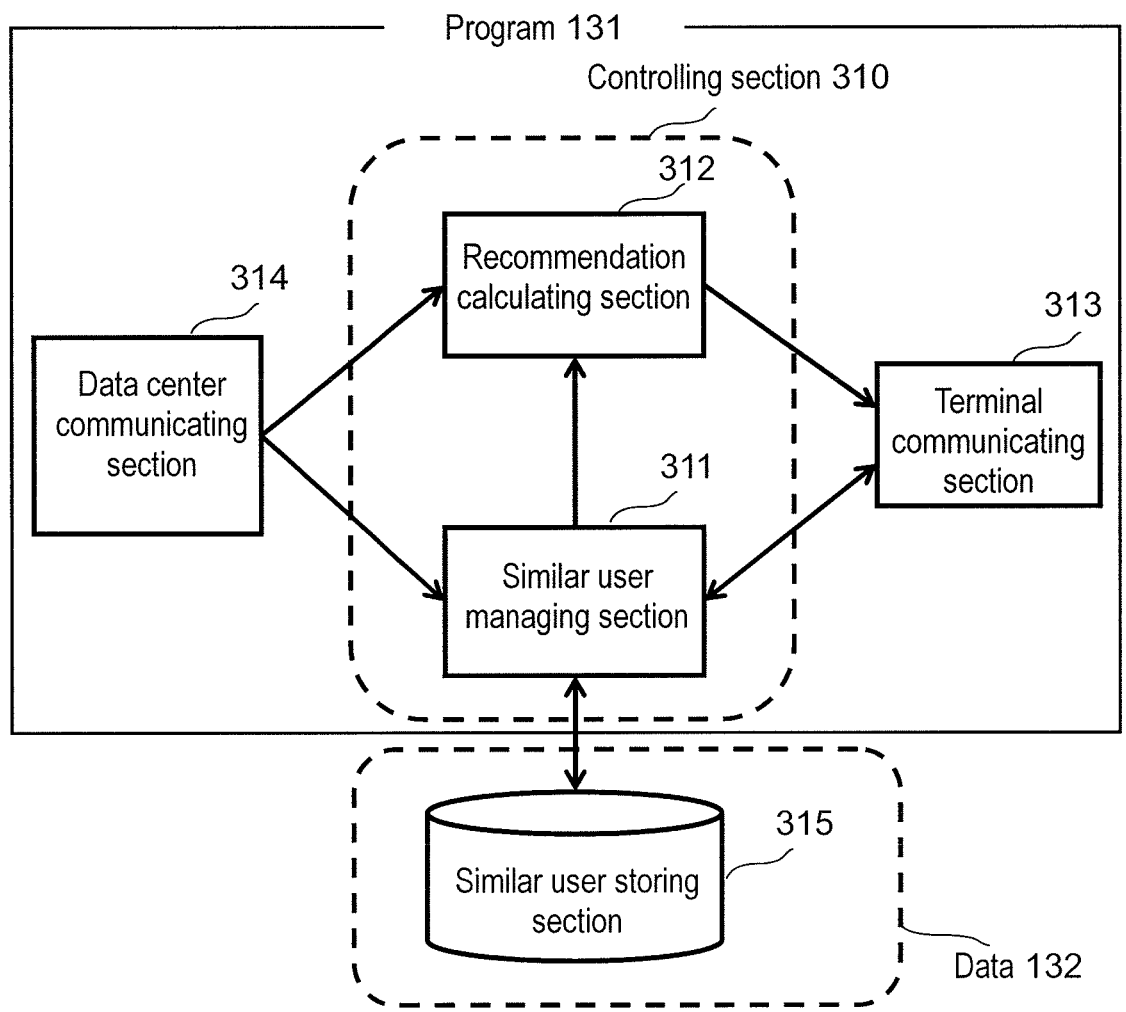
FIG. 7 illustrates a configuration of program 131 that operates in service provider 130 of the information providing system according to the first exemplary embodiment of the present disclosure.

FIG. 7 is a configuration diagram of program 131 that operates in service provider 130 of the information providing system according to the first exemplary embodiment of the present disclosure. For convenience of description, FIG. 7 also illustrates data 132 together.

In FIG. 7, program 131 in service provider 130 includes controlling section 310, terminal communicating section 313, and data center communicating section 314. Controlling section 310 includes similar user managing section 311 and recommendation calculating section 312. Data 132 in service provider 130 includes similar user storing section 315.

Similar user managing section 311 determines whether two arbitrary users have a hobby and preference with an identical tendency among a plurality of users registered in data center 110. When the two users are determined to have a hobby and preference with an identical tendency, similar user managing section 311 manages the two users as similar users. Determination of whether two arbitrary users have a hobby and preference with an identical tendency is performed by the following method. The determination is made depending on whether two arbitrary users set similar evaluation values of evaluation data on an identical evaluation object, the evaluation data being stored in data center 110. At this time, when similar values are set, similar user managing section 311 determines that the two users have a hobby and preference with an identical tendency. Collaborative filtering technique is a well known method. In the collaborative filtering technique, a list of a certain user's evaluation value is compared with a list of another user's evaluation value. Then it is determined whether the two users have a hobby and preference with an identical tendency by similarity of the lists.

Similar user managing section 311 acquires, from data center 110, information (such as user information and user preference information) associated with users (dissimilar users) who do not have a hobby and preference with a tendency identical to a tendency of a targeted user 20 to whom a store is recommended (recommendation user, targeted user). Among dissimilar user information acquired from data center 110, similar user managing section 311 transmits part or all of the information to terminal 120. When part of the dissimilar user information is transmitted, similar user managing section 311 may determine whether to send the information depending on similarity of the evaluation value list regarding each dissimilar user. Similar user managing section 311 may determine depending on similarity of the user preference information. Similar user managing section 311 may determine depending on similarity of the user information (difference in age is big/small, address is near/far). Similar user managing section 311 may determine which dissimilar user information to transmit by a method other than the above methods.

Furthermore, from among the dissimilar users transmitted to terminal 120, similar user managing section 311 manages another user (additional user) selected by the recommendation user who considers that the another user may be added to the similar users as an additional user to be added to the similar users of the recommendation user. After a similar user is determined by a method based on an evaluation value or the like, similar user managing section 311 checks whether the additional user selected by the recommendation user is included in the similar users. When the additional user is not included in the similar users, similar user managing section 311 adds the additional user to the similar users.

Recommendation calculating section 312 determines a store for recommending to targeted user 20 (recommendation user) based on an evaluation value etc. Specifically, first, recommendation calculating section 312 acquires from data center 110 each store evaluation data set by a similar user whom similar user managing section 311 manages as similar to the recommendation user. Next, recommendation calculating section 312 extracts a store on which many similar users set high evaluation values based on the acquired evaluation data. Recommendation calculating section 312 acquires store information about the extracted store from data center 110, and transmits the store information to terminal 120 (user 20) as a store for recommendation.

Terminal communicating section 313 performs communication between service provider 130 and terminal 120. When similar user managing section 311 or recommendation calculating section 312 requests data transmission to terminal 120, or when data is received from terminal 120, terminal communicating section 313 performs transmission and reception processing of the data.

Data center communicating section 314 performs communication between controlling section 310 and controlling section 300 in data center 110. When similar user managing section 311 or recommendation calculating section 312 requests data transmission to data center 110, or when data is received from data center 110, data center communicating section 314 performs transmission and reception processing of the data.

Similar user storing section 315 stores data managed by similar user managing section 311 as a similar user list. Similar user storing section 315 associates a user ID with a list of a user ID of a user managed as a similar user similar to a user indicated by the user ID for retention. Similar user storing section 315 associates an additional user whom the user has selected as appropriate for addition with the user's user ID and stores information regarding the additional user.

<Data Structure>

The information providing system according to the first exemplary embodiment of the present disclosure includes data 112 and data 132 illustrated in FIG. 1, FIG. 6, and FIG. 7. Data 112 and data 132 include various kinds of data used by the information providing system.

FIG. 8 to FIG. 13 each illustrate structure of data included in data 112 in data center 110 of the information providing system according to the first exemplary embodiment of the present disclosure.

FIG. 8 illustrates data structure of user information list 200 of the information providing system according to the first exemplary embodiment of the present disclosure. User information list 200 is user information managed by user information managing section 303. User information list 200 includes a user ID for identifying a user and user information associated with the user ID. The user information includes at least part of information such as a name of the user, an address of the user, an age of the user, and a gender of the user.

FIG. 9 illustrates data structure of appliance list 201 of the information providing system according to the first exemplary embodiment of the present disclosure. Appliance list 201 is user information managed by user information managing section 303. Appliance list 201 includes a user ID and an appliance ID list associated with the user ID. The appliance ID list is a list of appliance IDs that shows appliances that the user possesses.

Figure 10:
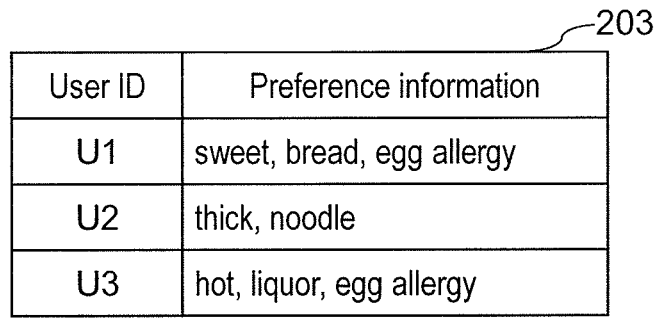
FIG. 10 illustrates data structure of preference information list 203 of the information providing system according to the first exemplary embodiment of the present disclosure.

FIG. 10 illustrates data structure of preference information list 203 of the information providing system according to the first exemplary embodiment of the present disclosure. Preference information list 203 is user preference data managed by user preference information managing section 304. Preference information list 203 includes a user ID and preference information associated with the user ID. The preference information is information that shows what the user likes. The preference information includes, for example, a type of favorite food, such as "Japanese food", "Western food", "Chinese food", "French food", and "Italian food". The preference information includes a favorite food material, such as "bread", "vegetable", "beef", "fish", "pasta", "fruit", and "cake". The preference information includes a favorite cooking method, such as "roast", "deep-fry", "boil", "raw", and "stir-fry". The preference information includes a favorite food preference tendency, such as "sweet", "bitter", "hot", "sour", "fatty", and "light-seasoned". The preference information includes information regarding an allergy-causing substance to which the user pays attention, such as "for those with egg allergies", "for those with wheat allergies", "for those with shrimp allergies", "for those with crab allergies", "for those with peanut allergies", or "egg-free", "wheat-free". The preference information includes information regarding an amount of food to serve, such as "large serving" and "small serving". The preference information includes information regarding an atmosphere, such as "calm" and "active" in addition to preference information regarding eating and drinking. The preference information includes information regarding space, such as "large", "small", "dark", "bright", "cold", and "warm". The preference information only needs to include at least part of the above pieces of information. A combination of these pieces of information may also be defined as preference information.

Figure 11:
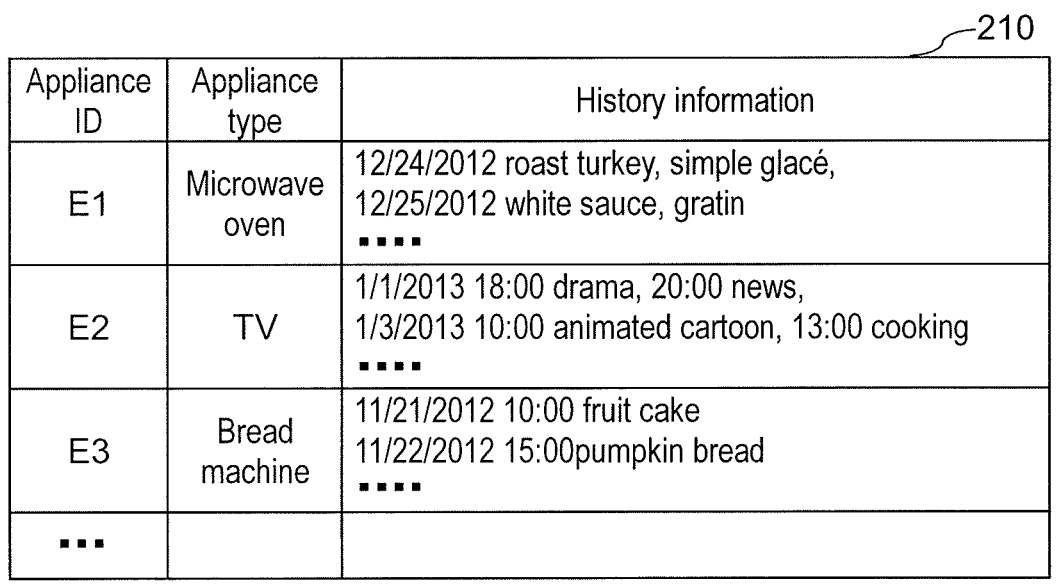
FIG. 11 illustrates data structure of home appliance history 210 of the information providing system according to the first exemplary embodiment of the present disclosure.

FIG. 11 illustrates data structure of home appliance history 210 of the information providing system according to the first exemplary embodiment of the present disclosure. Home appliance history 210 is data managed by appliance history information managing section 305. Home appliance history 210 includes an appliance ID for identifying an appliance, an appliance type that shows a type of the appliance, and history information obtained from the appliance. The appliance type and history information are associated with the appliance ID for management. The appliance type is a product type such as, for example, "television", "washing machine", "refrigerator", "microwave oven", and "bread machine". The history information is log information provided from each of the appliances.

FIG. 12 illustrates data structure of store information list 220 of the information providing system according to the first exemplary embodiment of the present disclosure. Store information list 220 is data managed by store information managing section 301. Store information list 220 includes a store ID for identifying a store and store information associated with the store ID. The store information includes a name of the store, an address of the store, an icon for a user to easily identify the store, a category of the store for showing what kind of store the store is. The category of the store refers to, for example, in a case of a restaurant, a type of food served at the store, such as "Japanese food", "Western food", "Chinese food", "French food", and "Italian food". The category of the store refers to a food material on which the store focuses, such as "bread", "vegetable", "beef", "fish", "pasta", "fruit", and "cake". The category of the store refers to a cooking method on which the store focuses, such as "roast", "deep-fry", "boil", "raw", and "stir-fry". The category of the store further refers to a preference tendency of food served at the store, such as "sweet", "bitter", "hot", "sour", "fatty", and "light-seasoned". The category of the store refers to information regarding an allergy-causing substance to which the store pays attention, such as "for those with egg allergies", "for those with wheat allergies", "for those with shrimp allergies", "for those with crab allergies", "for those with peanut allergies", or "egg-free", "wheat-free". The category of the store refers to information regarding an amount of food to serve, such as "large serving" and "small serving". The category of the store refers to category information regarding an atmosphere, such as "calm" and "active" in addition to preference information regarding eating and drinking. The category of the store refers to category information regarding space of the store, such as "large", "small", "dark", "bright", "cold", and "warm". The category information only needs to include at least part of the above pieces of information. A combination of these pieces of information may be defined as category information.

FIG. 13 illustrates data structure of evaluation value list 230 of the information providing system according to the first exemplary embodiment of the present disclosure. Evaluation value list 230 is data managed by evaluation data managing section 302. Evaluation value list 230 includes a user ID and an evaluation value associated with the user ID. The evaluation value is a value for every store identified by the store ID. One evaluation value exists for one set of one user ID and one store ID.

FIG. 14 illustrates data structure of similar user list 202 of the information providing system according to the first exemplary embodiment of the present disclosure. Similar user list 202 is data stored in similar user storing section 315, the data being managed by similar user managing section 311. Similar user list 202 includes a user ID and a similar user ID list associated with the user ID. The similar user ID list is a list of a user ID of a similar user similar to a user of the user ID.

<Display in Terminal 120>

Figure 15:
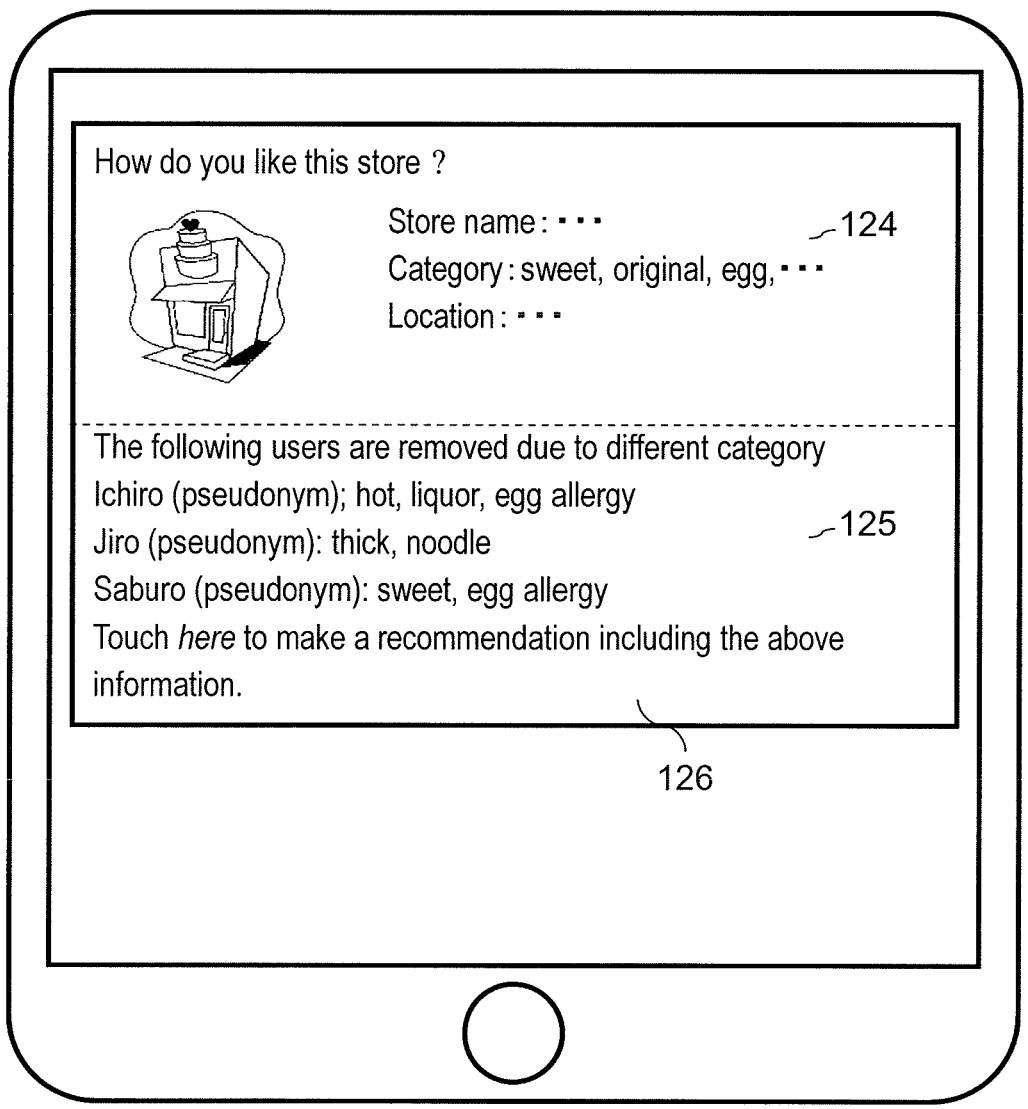
FIG. 15 illustrates an exemplary screen display at a time of information provision in terminal 120 of the information providing system according to the first exemplary embodiment of the present disclosure.

The information providing system according to the first exemplary embodiment of the present disclosure provides a user with information that suits preference of the user among a large amount of information via terminal 120. FIG. 15 to FIG. 17 each illustrate an exemplary screen display in terminal 120 when a user is provided with information.

FIG. 15 illustrates an exemplary screen display at a time of information provision (recommendation) in terminal 120 of the information providing system according to the first exemplary embodiment of the present disclosure.

In FIG. 15, terminal 120 includes store information display area 124 for providing information that suits preference of the user, and user information display area 125 for providing information about a dissimilar user who does not have preference with a tendency identical to a tendency of the user. Terminal 120 further includes additional intention input button 126 for the user to convey to the system an intention of adding a user who is used as a base when the system selects a store whose information is to be provided to the user.

Store information display area 124 displays an icon for allowing the user to easily identify the store, a name of the store, a category of the store, and a location of the store.

User information display area 125 displays one or more pieces of user information. Examples of the user information include information such as a name for identifying the user and preference information of the user. A privacy problem may occur if the user name is used as it is as information for identifying the user. Methods of avoiding such a problem include a method of using another name that is not the user's name, a method of using a number or a symbol instead of the name, and a method of using an image instead of a character.

Additional intention input button 126 conveys an intention of the user to the system. For example, the touch by the user on a character displaying "HERE" conveys an intention of the user to the system. In addition, providing a dedicated switch and pushing the switch may convey an intention of the user to the system. Alternatively, displaying a button that represents an image of a switch and the user touching the image of the button may convey an intention of the user.

Figure 16A:
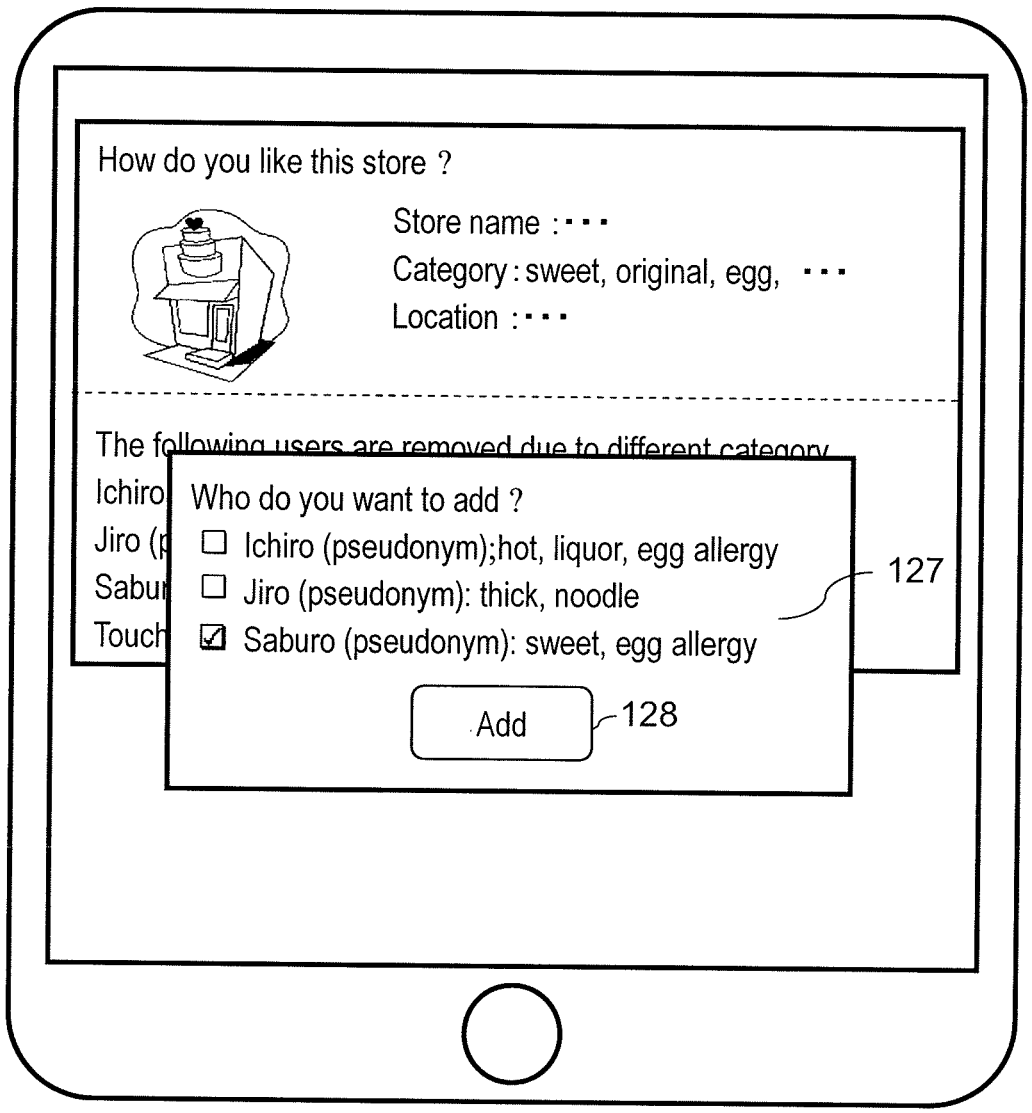
FIGS. 16(A) and 16(B) each illustrate an exemplary screen display at a time of additional user selection processing in terminal 120 of the information providing system according to the first exemplary embodiment of the present disclosure.
Figure 16B:
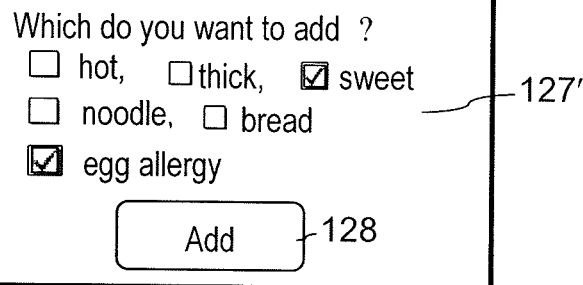
Figure 17:
FIG. 17 illustrates an exemplary screen display at a time of additional user selection processing in terminal 120 of the information providing system according to the first exemplary embodiment of the present disclosure.

FIGS. 16(A) and 16(B) each illustrate an exemplary screen display at a time of additional user selection processing in terminal 120 of the information providing system according to the first exemplary embodiment of the present disclosure.

In FIG. 16(A), terminal 120 includes check information display area 127 that displays information about a dissimilar user who does not have preference with a tendency identical to a tendency of the user, and a check box showing whether to add the dissimilar user. Terminal 120 further includes addition button 128 for conveying to the system an intention of adding a user with a check box in check information display area 127 being checked.

Check information display area 127 displays information about the dissimilar user. At this time, as information about the dissimilar user, check information display area 127 may display information identical to the user information displayed in user information display area 125. Check information display area 127 may additionally display another piece of information together. Check information display area 127 displays a check box that shows whether to add the dissimilar user shown in the displayed user information to similar users. This allows the user himself or herself who uses terminal 120 to select a dissimilar user to be added as his or her own similar user. At this time, it is unnecessary to display information such as a name for identifying the user in check information display area 127 as user information. Check information display area 127 may display only preference information (for example, FIG. 11(B)).

Addition button 128 is a button for allowing the user who uses terminal 120 to give to the present system an instruction for adding a dissimilar user to the similar users, the dissimilar user with a check box in check information display area 127 being checked. When a touch on addition button 128 is detected, terminal 120 notifies service provider 130 of a user to be added to the similar users from among the dissimilar users.

FIG. 17 illustrates an exemplary screen display at a time of re-providing information (re-recommendation) in terminal 120 of the information providing system according to the first exemplary embodiment of the present disclosure.

In FIG. 17, terminal 120 includes store information re-display area 129 for providing information that suits preference of the user after part of the dissimilar users are added to the similar users.

After a touch on addition button 128 in FIG. 16(A), store information to be provided to the user is sent again to terminal 120 in response to a notification to service provider 130 of the user to be added to the similar users.

Store information re-display area 129 displays the store information to be provided to the user, the store information being sent again to terminal 120.

In FIG. 17, terminal 120 may include a user information display area that provides information about a dissimilar user who does not have preference with a tendency identical to a tendency of the user, in the same way as FIG. 15. Terminal 120 may further include an additional intention input button for the user to convey to the system an intention of adding a user who is used as a base when the system selects a store whose information is to be provided to the user. This makes it possible, after addition of part of the dissimilar users to the similar users, to add part of the dissimilar users to the similar users again. This allows further improvement in the accuracy of the information to be provided to the user.

<Similar User Association Processing>

Service provider 130 manages which user has a hobby and preference similar to a hobby and preference of which user. Determination about whether a user has similar hobby and preference is made based on evaluation data. Accordingly, service provider 130 needs to review association of the similar users about which user has a hobby and preference similar to a hobby and preference of which user when the evaluation data in data center 110 is updated.

Figure 18:
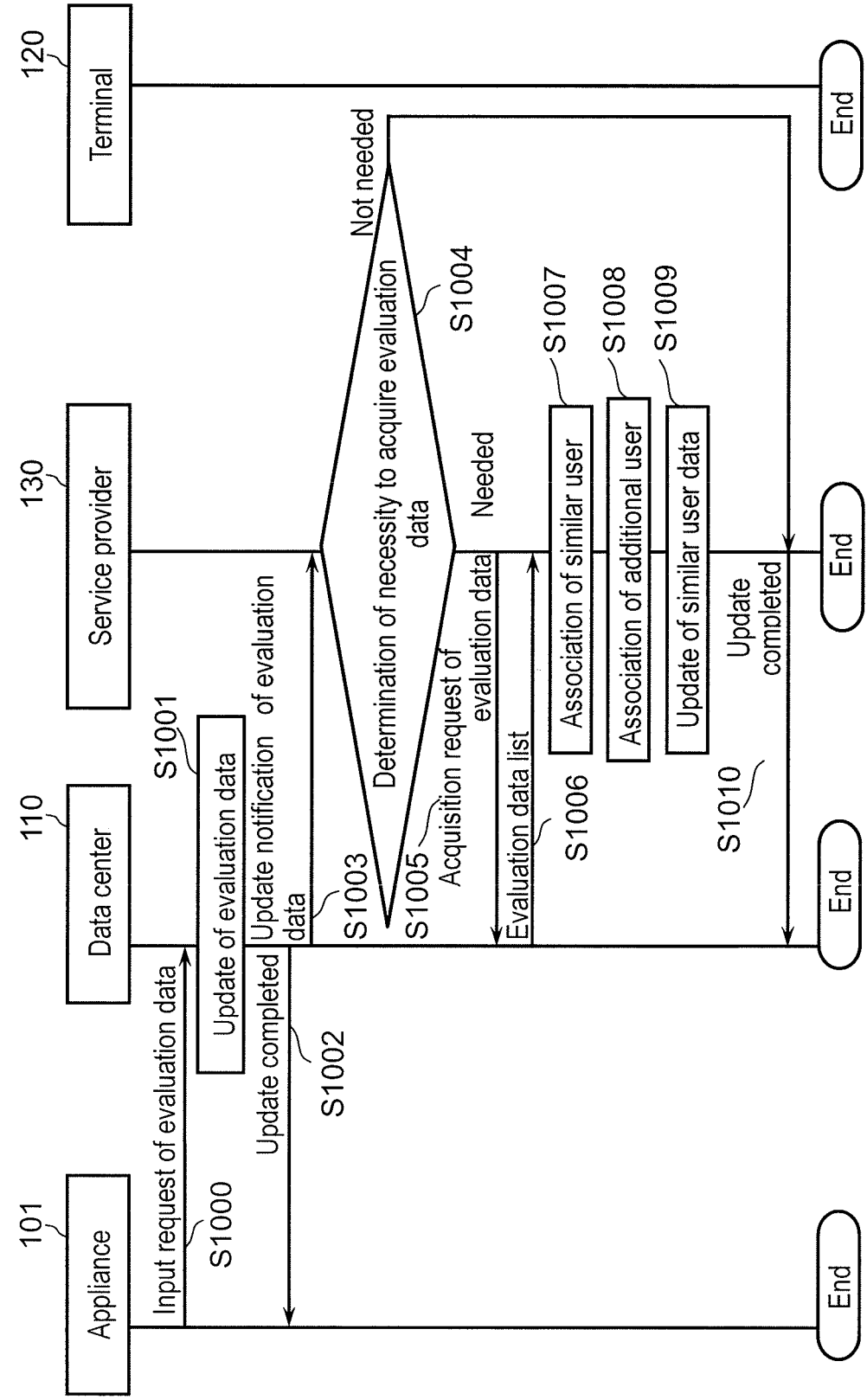
FIG. 18 illustrates sequence of similar user association processing of the information providing system according to the first exemplary embodiment of the present disclosure.

The following describes processing of service provider 130 to make an association as a similar user in response to a notification from data center 110 with reference to a flow chart of FIG. 18.

First, a user requests data center 110 to input evaluation data using appliance A or appliance B included in appliance group 101 (S1000). Evaluation data managing section 302 in data center 110 updates the evaluation data included in data 112 to a value requested by the user (S1001). Evaluation data managing section 302 in data center 110 notifies an appliance of the completion of updating the evaluation data, the appliance having requested updating in S1000 among appliance A and appliances B included in appliance group 101 (S1002).

Subsequently, evaluation data managing section 302 in data center 110 notifies service provider 130 that the evaluation data has been updated (S1003). Similar user managing section 311 in service provider 130 acquires the evaluation data from data center 110, and determines whether it is necessary to change the association of the similar users (S1004). When determination is made in step S1004 that it is necessary to change the association, similar user managing section 311 in service provider 130 requests data center 110 to acquire the updated evaluation data (S1005).

In response to the request from service provider 130 for acquisition of the evaluation data, evaluation data managing section 302 in data center 110 acquires the evaluation data from data 112, and provides a list of the evaluation data to service provider 130 (S1006). The list of the evaluation data to be provided from data center 110 to service provider 130 may be a difference of the evaluation data updated after the last time when service provider 130 has requested acquisition of the evaluation data.

Similar user managing section 311 in service provider 130 associates each user again with the similar users from the list of the evaluation data received from the data center 110 (S1007). Subsequently, similar user managing section 311 associates an additional user as a similar user (S1008) when there is an additional user who has not been associated with a user among dissimilar users each specified as an additional user for each user. Finally, similar user managing section 311 updates the data stored in similar user storing section 315 to the data regarding the new similar users (S1009). At this time, the evaluation data obtained from data center 110 is also stored in similar user storing section 315 together with the association information. After the processing in step S1009, or in a case of determination in step S1004 that the association does not need to be changed, similar user managing section 311 notifies data center 110 of the completion of the update process (S1010).

This makes it possible to update securely the data regarding the similar users in service provider 130 when the user updates the evaluation data (such as addition, change, and deletion). This makes it possible to always retain the data regarding the similar users in the latest condition. This also makes it possible, when the evaluation data is updated, to determine whether to acquire the updated information. For example, when data center 110 notifies a difference from the last update, it is possible to determine whether to update the evaluation data depending on the difference. It is possible to put restrictions, such as performing the update processing only when service provider 130 has a light load to process, and only when data communication traffic between data center 110 and service provider 130 is light.

<Recommendation Information Display Processing>

Terminal 120 requests service provider 130 to acquire information about a store to recommend to a user in response to a request from the user. Together with store information of a recommended store obtained from service provider 130, terminal 120 obtains, from service provider 130, information about a dissimilar user who does not have a hobby and preference similar to a hobby and preference of the user who has requested recommendation. Terminal 120 then shows the store information and the dissimilar user information to the user.

Figure 19:
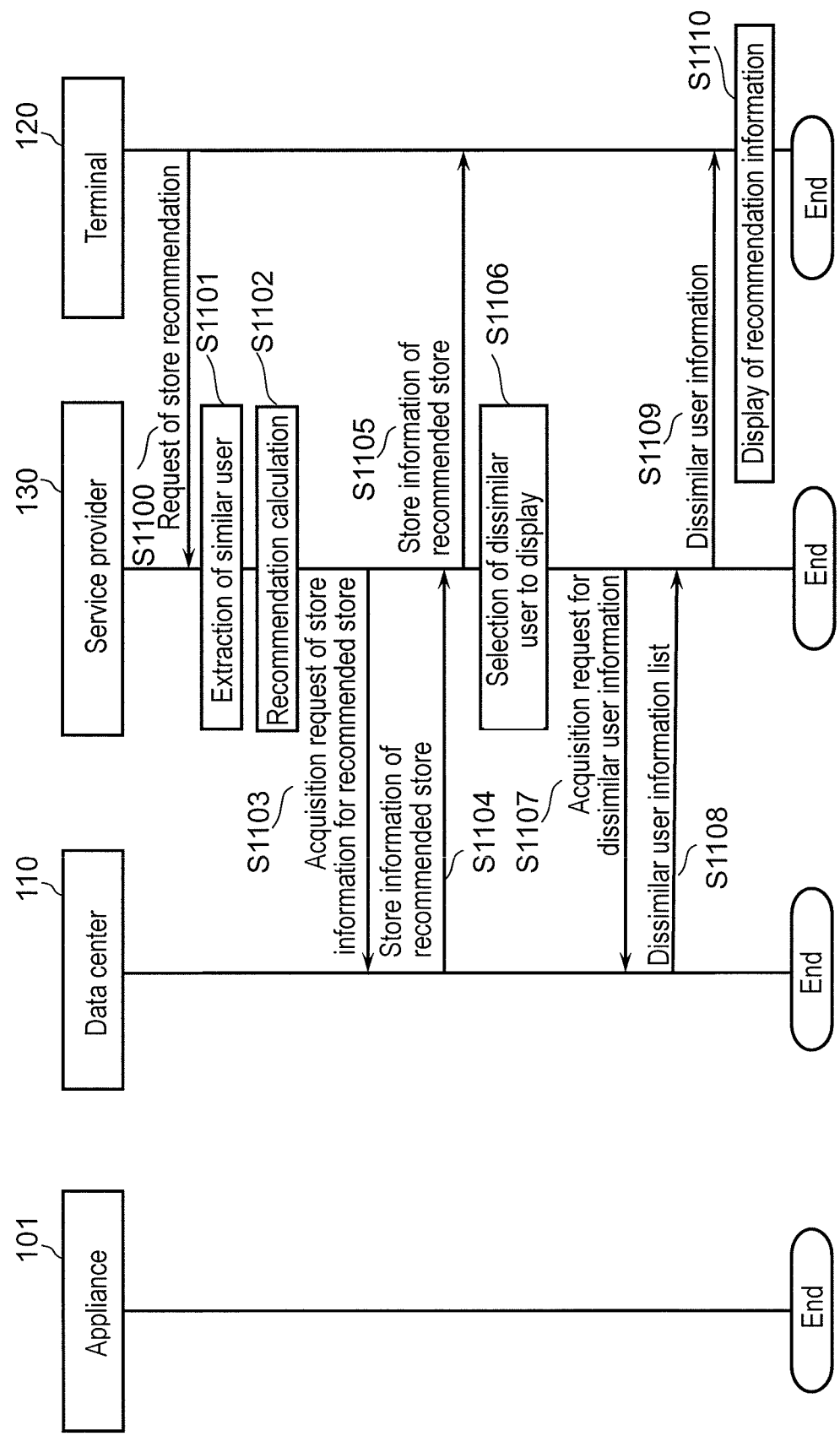
FIG. 19 illustrates recommendation information display processing sequence of the information providing system according to the first exemplary embodiment of the present disclosure.

With reference to a flow chart of FIG. 19, the following describes the processing in which, in response to a request from a user, terminal 120 requests service provider 130 to recommend a store and displays information obtained from service provider 130 on a screen of terminal 120, thereby showing recommendation information to the user.

First, in response to the request from the user, terminal 120 requests service provider 130 to acquire information about a store to recommend to the user (S1100). Similar user managing section 311 in service provider 130 acquires, from similar user storing section 315, a list of a user who has a hobby and preference similar to a hobby and preference of the user who has requested via terminal 120 (S1101). Similar user managing section 311 in service provider 130 then notifies recommendation calculating section 312 of the list. The data to be notified to recommendation calculating section 312 is an ID and evaluation data of the similar user. Recommendation calculating section 312 in service provider 130 extracts a store to recommend to the user based on the similar user list notified from similar user managing section 311 (S1102). Recommendation calculating section 312 in service provider 130 requests data center 110 to acquire information about the extracted store to recommend to the user (S1103).

Store information managing section 301 in data center 110 acquires information about the requested store from data 112, and transmits the information to service provider 130 as store information of a recommended store (S1104).

Recommendation calculating section 312 in service provider 130 transmits the store information acquired from data center 110 to terminal 120 as information about a store to be recommended to the user (S1105). Similar user managing section 311 in service provider 130 selects a dissimilar user who does not have a hobby and preference similar to a hobby and preference of the user, the dissimilar user being displayed together with the store information of a recommended store (S1106). Similar user managing section 311 requests data center 110 to acquire user information about the selected dissimilar user (S1107).

User information managing section 303 in data center 110 acquires from data 112 user information about the user specified by service provider 130. User information managing section 303 in data center 110 then transmits the user information to service provider 130 as a list of dissimilar user information (S1108).

Similar user managing section 311 in service provider 130 transmits to terminal 120 the user information list acquired from data center 110 as the dissimilar user information (S1109).

Terminal 120 displays on a screen the store information received from service provider 130 in step S1105 and the dissimilar user information received from service provider 130 in step S1109, thereby providing the user with the information (S1110). As illustrated in FIG. 15, terminal 120 displays the store information received in step S1105 in store information display area 124. Terminal 120 displays the dissimilar user information received in step S1109 in user information display area 125.

<Dissimilar User Addition Processing>

The user sometimes dislikes the store displayed on terminal 120 in the above-described recommendation information display processing. In such a case, the user performs the following in order to improve the accuracy of recommendation. The user selects a user who is considered to be similar to himself or herself from among users classified into dissimilar users. Alternatively, the user selects a user for whom a category to be recommended has been set. The user then requests service provider 130 to manage the selected user as a similar user. Subsequently, the user causes service provider 130 to show a store to recommend again, thereby obtaining more accurate recommendation information.

Figure 20:
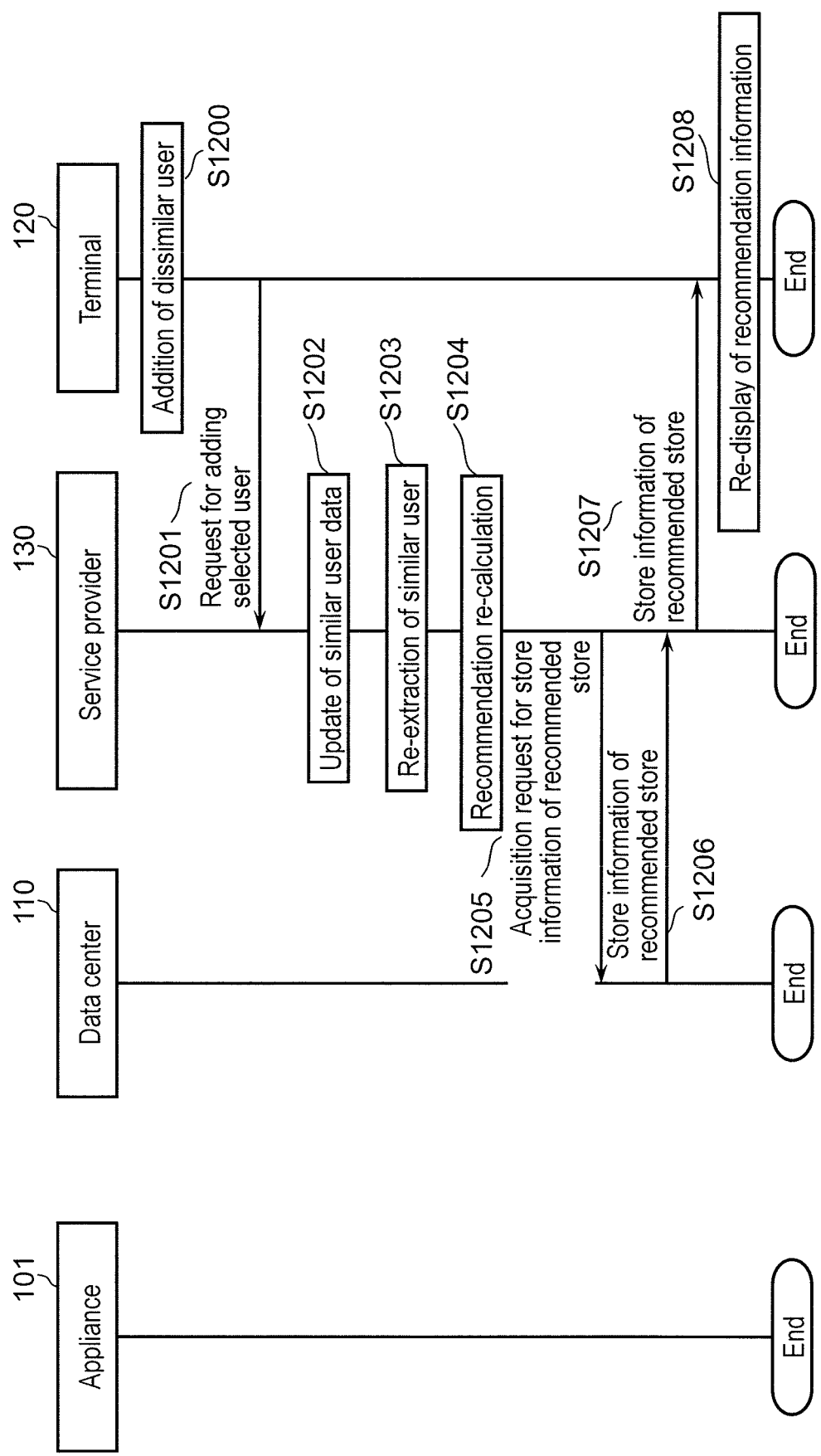
FIG. 20 illustrates dissimilar user addition processing sequence of the information providing system according to the first exemplary embodiment of the present disclosure.

With reference to a flow chart of FIG. 20, the following describes the processing in which, in response to a request from terminal 120, service provider 130 adds the requested dissimilar user to similar users and selects a store to recommend again based on the similar users.

First, when the user requests recommendation of a store different from a store displayed on store information display area 124 of terminal 120, the user touches additional intention input button 126. In response to the touch, terminal 120 displays check information display area 127, as described in FIG. 16(A). The user determines a user to be added to similar users from among user information displayed in check information display area 127, and checks a check box associated with the user to be added to the similar users. Subsequently, the user touches addition button 128 and notifies terminal 120 of addition of the dissimilar user to similar users. Terminal 120 generates a list of a user ID of a user (selected user) with the check box being checked (S1200). Terminal 120 transmits the list of the user ID of the selected user to service provider 130 and requests service provider 130 to add the selected user (S1201).

Similar user managing section 311 in service provider 130 adds the user ID of the selected user received from terminal 120 to similar users of the user who uses terminal 120, and updates data stored in similar user storing section 315 (S1202). Similar user managing section 311 in service provider 130 extracts a similar user list again from similar user storing section 315 (S1203), and notifies the list to recommendation calculating section 312. Recommendation calculating section 312 in service provider 130 extracts a store to be recommended to the user based on the similar user list notified from similar user managing section 311 (S1204). Recommendation calculating section 312 in service provider 130 requests data center 110 to acquire information about the extracted store to recommend to the user (S1205).

Store information managing section 301 in data center 110 acquires the requested store information from data 112, and transmits the information to service provider 130 as store information of a recommended store (S1206).

Recommendation calculating section 312 in service provider 130 transmits the store information acquired from data center 110 to terminal 120 as information about the store to be recommended to the user (S1207).

Terminal 120 displays the received store information on a screen and provides the user with the information (S1208). Terminal 120 displays the received store information in store information redisplay area 129, as illustrated in FIG. 17. As dissimilar user addition processing, service provider 130 may perform only similar user data update processing of step S1202 after step S1201, may end the processing, and may return processing to terminal 120. At this time, terminal 120 may perform recommendation information display processing after dissimilar user addition processing. Service provider 130 performs step S1106 to step S1109 of the recommendation information display processing after step S1207. Terminal 120 may display, in step S1208, not only store information but also information regarding dissimilar users together in the same manner as step S1110. Terminal 120 includes store information display area 124 and user information display area 125 instead of store information redisplay area 129, as illustrated in FIG. 15. Terminal 120 may display the store information received in step S1207 in store information display area 124. Terminal 120 may display the dissimilar user information received in step S1109 in user information display area 125.

Second Exemplary Embodiment

In the first exemplary embodiment of the present disclosure, data center 110 manages information about a store and a user, an appliance history, and the like, and service provider 130 provides the user with information via terminal 120. The following describes a configuration of a second exemplary embodiment in which data center 110 includes a function of service provider 130, as described in service pattern 1.

The following describes the system configuration in service pattern 1 according to the second exemplary embodiment of the present disclosure illustrated in FIG. 2.

<System Configuration in Service Pattern 1>

Figure 21:
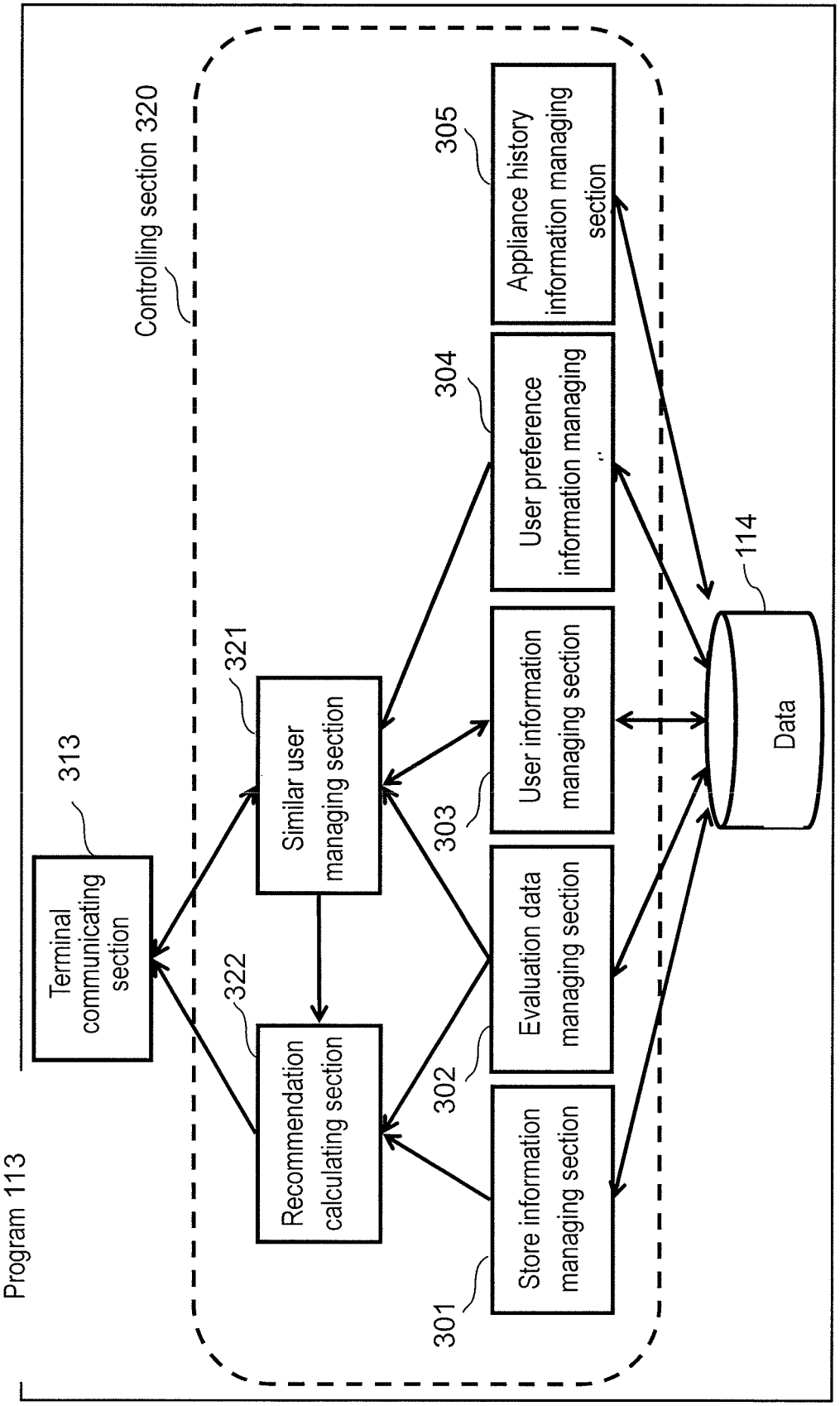
FIG. 21 illustrates a configuration of program 113 that operates in data center 110 of the information providing system according to a second exemplary embodiment of the present disclosure.

FIG. 21 is a configuration diagram of program 113 that operates in data center 110 of an information providing system according to the second exemplary embodiment of the present disclosure. For convenience of description, FIG. 21 also illustrates data 114 together. In FIG. 21, components identical to components in FIGS. 1(A) to 1(C) and FIG. 2 have identical reference symbols and the description thereof will be omitted.

In FIG. 21, program 113 in data center 110 includes controlling section 320 and terminal communicating section 313. Controlling section 320 includes store information managing section 301, evaluation data managing section 302, user information managing section 303, user preference information managing section 304, appliance history information managing section 305, similar user managing section 321, and recommendation calculating section 322.

Similar user managing section 321 determines whether two arbitrary users have a hobby and preference with an identical tendency among users registered in user information managing section 303. When the two users are determined to have a hobby and preference with an identical tendency, similar user managing section 321 registers the two users in user information as similar users. The following is a method of determining whether two arbitrary users have a hobby and preference with an identical tendency. The determination is made based on, for example, whether two arbitrary persons set similar evaluation values on an identical evaluation object in evaluation data managed by evaluation data managing section 302. When another user is registered in the user information as a similar user, the registration is performed via user information managing section 303. At this time, the similar user may be managed by adding the similar user ID list in similar user list 202 (FIG. 14) to the user information in user information list 200 (FIG. 8).

Similar user managing section 321 acquires information (such as user information and user preference information) associated with a dissimilar user from user information managing section 303 and user preference information managing section 304. The dissimilar user refers to a user who does not have a hobby and preference with a tendency identical to a tendency of a recommendation targeted user (recommendation user) to whom a store is recommended.

As described above, similar user managing section 321 basically has a function identical to a function of similar user managing section 311 described in the first exemplary embodiment except for processing of similar user managing section 311 making an inquiry of data center 110. Processing of similar user storing section 315 making an inquiry of data center 110 will be processing of making an inquiry of each data managing section in controlling section 320.

Recommendation calculating section 322 acquires evaluation data from evaluation data managing section 302, the evaluation data being set on each store by a similar user managed by similar user managing section 321. Next, recommendation calculating section 322 extracts a store that many similar users set a high evaluation value from among the evaluation data acquired from evaluation data managing section 302. Recommendation calculating section 322 acquires store information about the store extracted by recommendation calculating section 322 from store information managing section 301, and transmits the store information to terminal 120 as a recommendation store. Terminal communicating section 313 is used for communication with terminal 120.

Store information managing section 301, evaluation data managing section 302, user information managing section 303, user preference information managing section 304, and appliance history information managing section 305 acquire and set necessary data from data 114 in response to a request from similar user managing section 321 or recommendation calculating section 322.

<Similar User Association Processing, Recommendation Information Display Processing, Dissimilar User Addition Processing>

Among similar user association processing, recommendation information display processing, and dissimilar user addition processing, processing performed by service provider 130 in the first exemplary embodiment of the present disclosure is performed by data center 110 in the second exemplary embodiment of the present disclosure.

For example, evaluation data managing section 302 notifies an evaluation data update notification (S1003) of FIG. 18 directly to similar user managing section 321. An evaluation data acquisition request (S1005) and a response processing (S1006) to the evaluation data acquisition request are performed by communication between similar user managing section 321 and evaluation data managing section 302. In addition, processing of acquiring store information of a recommended store (S1103 and S1104 of FIG. 19, S1205 and S1206 of FIG. 20) are performed by communication between recommendation calculating section 322 and store information managing section 301. Processing of acquiring dissimilar user information (S1107 and S1108 of FIG. 19) is performed by communication between similar user managing section 321 and user information managing section 303.

A request from terminal 120 (S1100, S1201) and a notification to terminal 120 (S1105, S1109, S1207) are performed by communication between terminal 120 and data center 110.

Third Exemplary Embodiment

In the first exemplary embodiment of the present disclosure, data center 110 manages information about a store and a user, an appliance history, and the like, and service provider 130 provides the user with information via terminal 120. The following describes a configuration of a third exemplary embodiment in which data center 110 includes program 111 and program 141, as illustrated in service pattern 2 (FIG. 3). Program 111 has a function similar to a function of data center 110 in the first exemplary embodiment. Program 141 has a function similar to a function of service provider 130 in the first exemplary embodiment.

The following describes a system configuration in service pattern 2 according to the third exemplary embodiment of the present disclosure.

<System Configuration in Service Pattern 2>

Data center 110 of an information providing system according to the third exemplary embodiment of the present disclosure includes program 111, program 141, and data 114.

Program 111 has a configuration identical to a configuration of program 111 in the first exemplary embodiment of the present disclosure (FIG. 6). While program 111 accesses data 112 in the first exemplary embodiment of the present disclosure, however, program 111 accesses data 114 in the third exemplary embodiment.

Program 141 has a configuration identical to a configuration of program 131 in the first exemplary embodiment of the present disclosure (FIG. 7). While program 131 accesses data 132 in the first exemplary embodiment of the present disclosure, however, program 141 accesses data 114 as program 111 does in the third exemplary embodiment.

Data 114 includes data of both data 112 and data 132 in the first exemplary embodiment of the present disclosure.

<Similar User Association Processing, Recommendation Information Display Processing, Dissimilar User Addition Processing>

Among similar user association processing, recommendation information display processing, and dissimilar user addition processing, processing performed by data center 110 in the first exemplary embodiment of the present disclosure is performed by program 111 in the third exemplary embodiment of the present disclosure. Processing performed by service provider 130 in the first exemplary embodiment of the present disclosure is performed by program 141 in the third exemplary embodiment of the present disclosure. That is, communication between data center 110 and service provider 130 in the first exemplary embodiment is replaced by communication between program 111 and program 141 in the third exemplary embodiment. Communication between service provider 130 and terminal 120 in the first exemplary embodiment of the present disclosure is replaced by communication between program 141 in data center 110 and terminal 120 in the third exemplary embodiment.

Program 141 requests program 111 to acquire information such as store information, user information, evaluation data, user preference information, and appliance history information. Program 141 however may also acquire information in another way. For example, program 141 may access data 114 directly and acquire information such as store information, user information, evaluation data, user preference information, and appliance history information. Program 141 may manage information regarding similar users as part of the user information in the same manner as the second exemplary embodiment instead of managing the user information and the information regarding the similar users separately.

<Service Pattern 3>

Service pattern 3 is a variation of service pattern 2. Many of functions of service pattern 3 are similar to functions of service pattern 2. For example, at a time of access to data 114, while program 111 directly accesses data 114 in service pattern 2, program 111 accesses data 114 via OS/middleware 115 in service pattern 3. Functionally, program 142 has a function identical to a function of program 141, and differs from program 141 in accessing data 114 via OS/middleware 115.

Fourth Exemplary Embodiment

In the first exemplary embodiment of the present disclosure, data center 110 manages information about a store and a user, an appliance history, and the like, and service provider 130 provides the user with information via terminal 120. The following describes a configuration of a fourth exemplary embodiment in which terminal 120 includes a function of service provider 130, as described in service pattern 4 (FIG. 5).

The following describes the system configuration in service pattern 4 according to the fourth exemplary embodiment of the present disclosure.

<System Configuration in Service Pattern 4>

Figure 22:
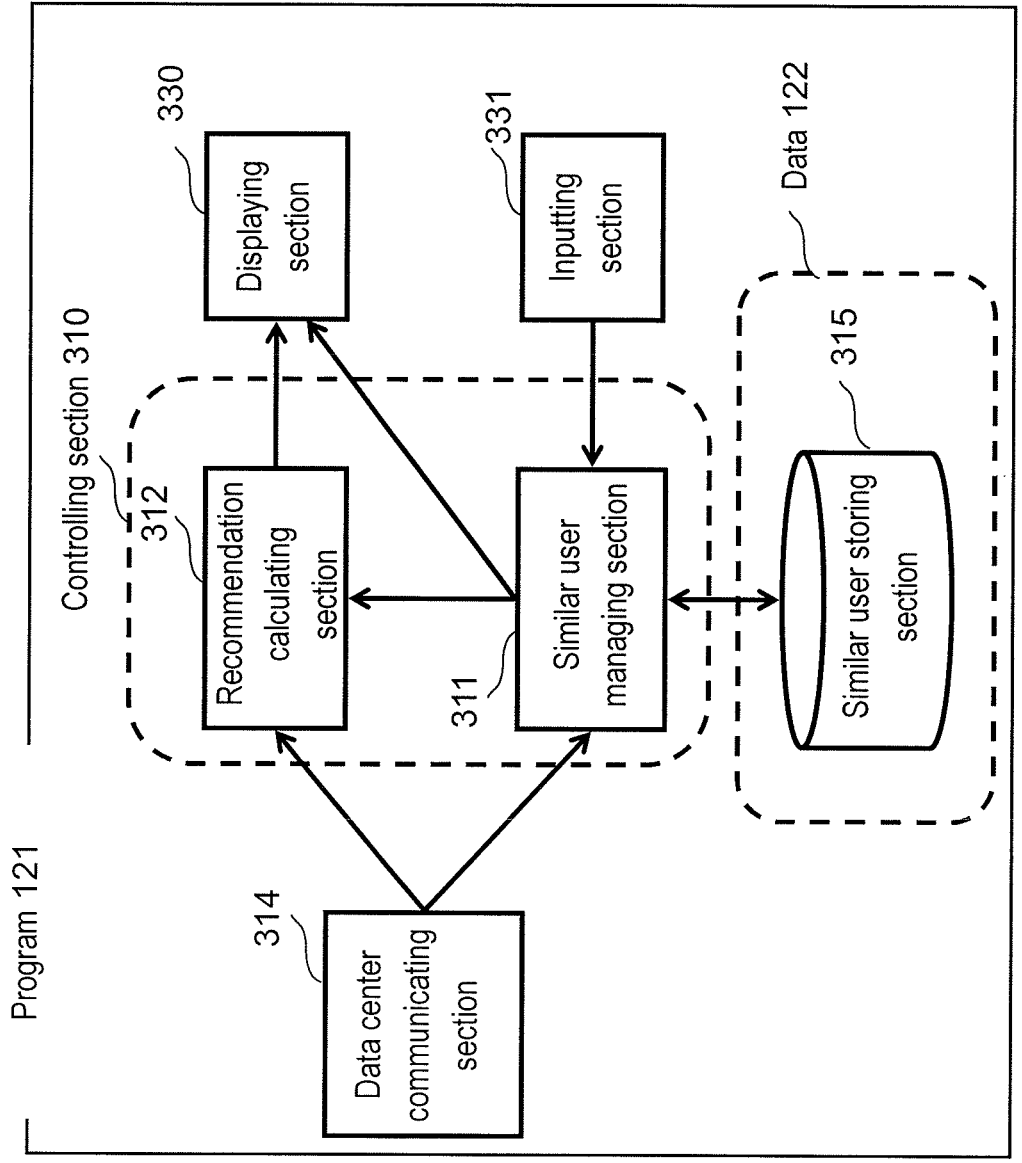
FIG. 22 illustrates a configuration of program 121 that operates in terminal 120 of the information providing system according to a fourth exemplary embodiment of the present disclosure.

FIG. 22 is a configuration diagram of program 121 that operates in terminal 120 of the information providing system according to the fourth exemplary embodiment of the present disclosure. For convenience of description, FIG. 22 also illustrates data 122 together. In FIG. 22, components identical to components in FIG. 6 and FIG. 7 have identical reference symbols and the description thereof will be omitted.

In FIG. 22, program 121 in terminal 120 includes controlling section 310, data center communicating section 314, displaying section 330, and inputting section 331. Controlling section 310 includes similar user managing section 311 and recommendation calculating section 312.

Displaying section 330 displays information in order to provide the user with various pieces of information.

Inputting section 331 inputs an instruction and information from the user.

Functionally, similar user managing section 311 and recommendation calculating section 312 have functions similar to functions of similar user managing section 311 and recommendation calculating section 312 in the first exemplary embodiment, respectively. In the first exemplary embodiment, however, similar user managing section 311 and recommendation calculating section 312 access terminal 120 via terminal communicating section 313 to exchange information with the user. In the fourth exemplary embodiment, on the other hand, since terminal 120 itself includes similar user managing section 311 and recommendation calculating section 312, similar user managing section 311 and recommendation calculating section 312 access displaying section 330 to provide the user with information. Similar user managing section 311 and recommendation calculating section 312 use inputting section 331 in order to obtain information from the user.

<Similar User Association Processing, Recommendation Information Display Processing, Dissimilar User Addition Processing>

Among similar user association processing, recommendation information display processing, and dissimilar user addition processing, processing performed by service provider 130 in the first exemplary embodiment of the present disclosure is performed by controlling section 310 in terminal 120 in the fourth exemplary embodiment of the present disclosure. That is, communication processing between data center 110 and service provider 130 in the first exemplary embodiment is replaced by communication processing between data center 110 and terminal 120 in the fourth exemplary embodiment. Communication between service provider 130 and terminal 120 in the first exemplary embodiment of the present disclosure corresponds to processing closed within terminal 120 in the fourth exemplary embodiment. When terminal 120 receives a request for recommending a store from the user, terminal 120 does not request another section as step S1100 of FIG. 19. Terminal 120 causes controlling section 310 within terminal 120 to perform the processing from step S1101 to step S1108 of FIG. 19, and finally displays recommendation information (S1110 of FIG. 19). Also when a dissimilar user to be added to similar users is selected, terminal 120 does not generate a list and not request another section as in step S1200 or S1201 of FIG. 20. Controlling section 310 in terminal 120 performs the processing from step S1202 to step S1206 of FIG. 20.

Fifth Exemplary Embodiment

In the fourth exemplary embodiment of the present disclosure, a configuration has been described in which terminal 120 includes a function of service provider 130, as described in service pattern 4 (FIG. 5). A fifth exemplary embodiment is a variation of the fourth exemplary embodiment. The following describes a configuration of the fifth exemplary embodiment in which terminal 120 includes a function of data center 110 and service provider 130. In the fifth exemplary embodiment, however, data center 110 is independently present apart from terminal 120. Data stored in data center 110 is synchronized with data in terminal 120. This makes it possible to provide a user with information even when terminal 120 cannot communicate with data center 110. The fifth exemplary embodiment describes such a configuration.

The following describes a system configuration of the variation of service pattern 4 according to the fifth exemplary embodiment of the present disclosure.
<System Configuration in Variation of Service Pattern 4>

Figure 23:
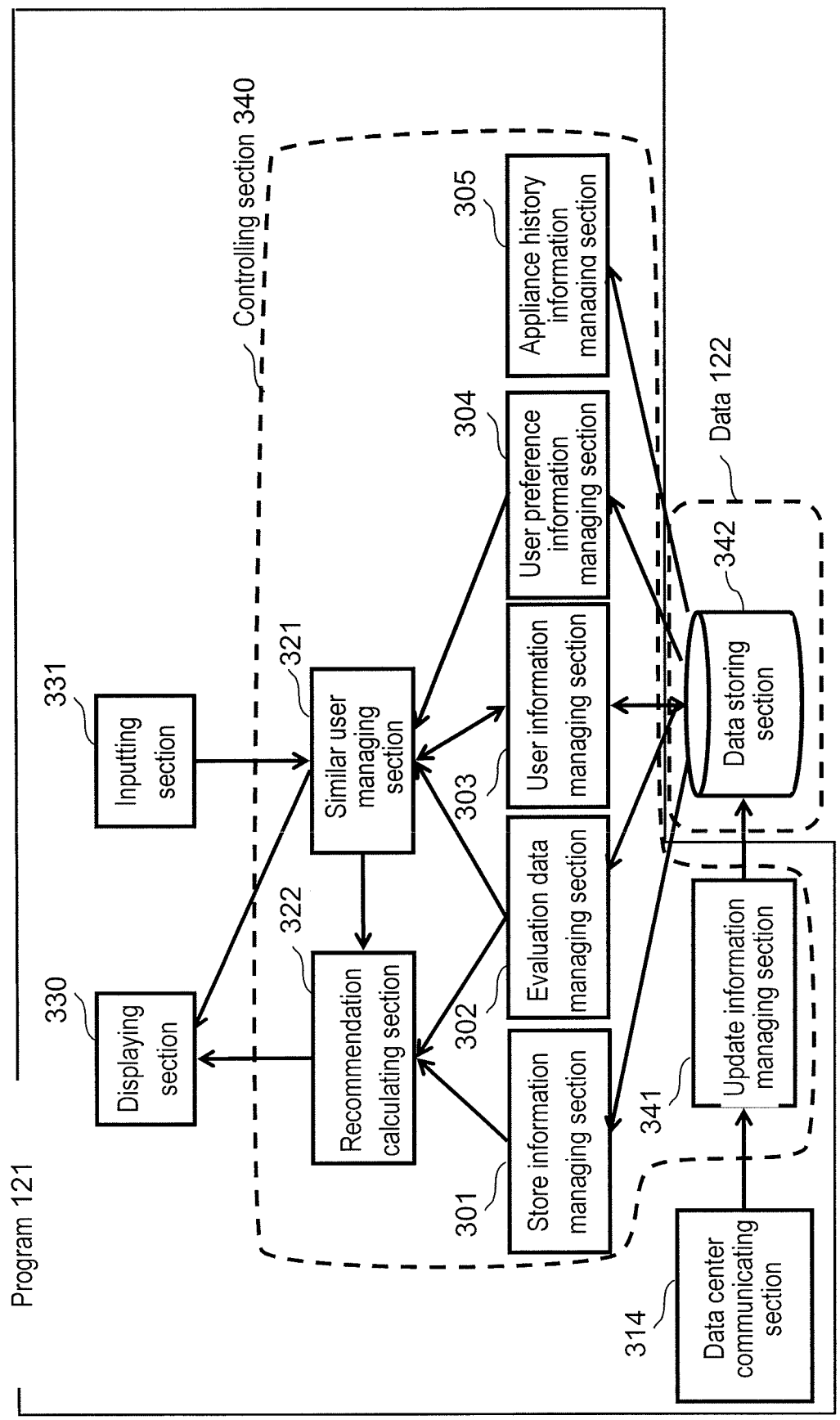
FIG. 23 illustrates a configuration of program 121 that operates in terminal 120 of the information providing system according to a fifth exemplary embodiment of the present disclosure.

FIG. 23 is a configuration diagram of program 121 that operates in terminal 120 of the information providing system according to the fifth exemplary embodiment of the present disclosure. In FIG. 23, components identical to components in FIG. 6, FIG. 7, and FIG. 21 have identical reference symbols and the description thereof will be omitted.

In FIG. 23, program 121 in terminal 120 includes controlling section 340, data center communicating section 314, displaying section 330, inputting section 331, and data 122. Controlling section 340 includes store information managing section 301, evaluation data managing section 302, user information managing section 303, user preference information managing section 304, appliance history information managing section 305, similar user managing section 321, recommendation calculating section 322, and update information managing section 341. Data 122 includes data storing section 342.

Functionally, store information managing section 301, evaluation data managing section 302, user information managing section 303, user preference information managing section 304, and appliance history information managing section 305 have functions similar to functions of respective managing sections in the second exemplary embodiment. However, access to data 114 in the second exemplary embodiment corresponds to access to data 122 in the fifth exemplary embodiment.

Functionally, similar user managing section 321 and recommendation calculating section 322 have functions similar to functions of similar user managing section 321 and recommendation calculating section 322 in the second exemplary embodiment, respectively. In the second exemplary embodiment, however, similar user managing section 321 and recommendation calculating section 322 access terminal 120 via terminal communicating section 313 to exchange information with the user. In the fifth exemplary embodiment, on the other hand, since terminal 120 itself includes similar user managing section 321 and recommendation calculating section 322, similar user managing section 321 and recommendation calculating section 322 access displaying section 330 to provide the user with information. Similar user managing section 321 and recommendation calculating section 322 use inputting section 331 in order to obtain information from the user.

Update information managing section 341 synchronizes data 117 in data center 110 and data 122 in terminal 120. When data 117 is changed, program 116 in data center 110 notifies the change to terminal 120. Program 121 in terminal 120 that receives the notification from program 116 updates data 122 using update information managing section 341.
<Data Update Processing>

Data center 110 changes data 117 when data is inputted from appliance A or appliance B included in appliance group 101, or when data is changed. Data center 110 further notifies terminal 120 that data 117 is changed. Data center 110 and terminal 120 reflect the change in data 117 on data 122.

Figure 24:
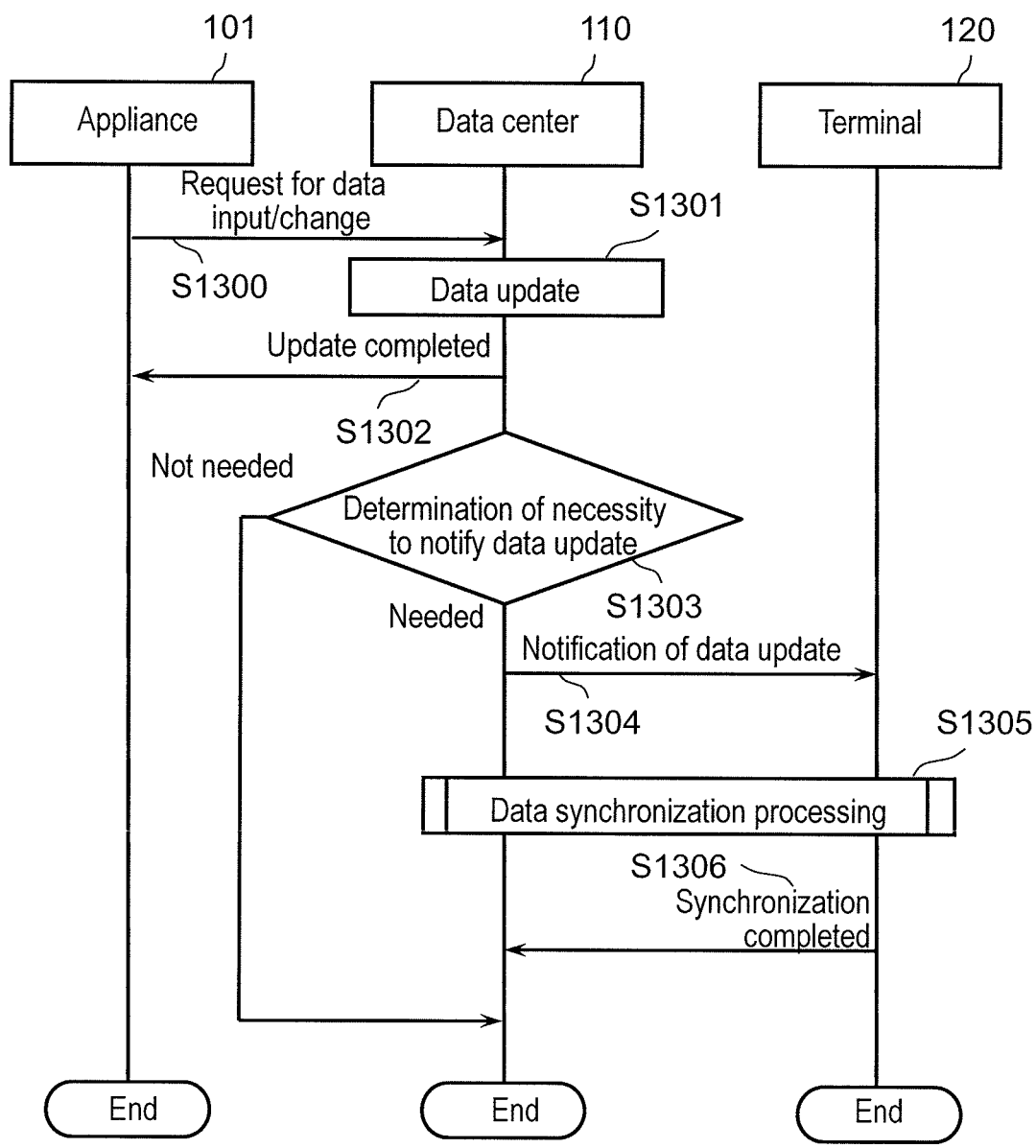
FIG. 24 illustrates data update processing sequence of the information providing system according to the fifth exemplary embodiment of the present disclosure.

With reference to a flow chart of FIG. 24, the following describes processing in which terminal 120 updates data 122 in response to the notification from data center 110.

First, appliance A and appliance B included in appliance group 101 request data center 110 to input or change data when user 10 inputs or changes information, or when appliance A or appliance B transmits log information to data center 110 (S1300).

Data center 110 updates data 117 using the data received from appliance A or appliance B (S1301). Data center 110 notifies an appliance which has sent the data that update of data 117 is completed (S1302). Subsequently, data center 110 determines whether it is necessary to notify terminal 120 that data 117 is updated (S1303). One of methods of determining whether it is necessary to notify is to determine that it is necessary to notify when an amount of change from last notification of an update of data 117 exceeds a certain amount. Data center 110 may determine that it is necessary to notify when specified data is changed. The specified data may be, for example, evaluation data, store information, or user information. The specified data may be a combination thereof. Another method of determining whether it is necessary to notify is as follows. For example, data center 110 may determine that it is necessary to notify when terminal 120 enters a specific state (such as a state of waiting for an input from a user, a state of charging, and a state of performing data communication). Data center 110 may determine that it is necessary to notify when high-speed access is available between terminal 120 and data center 110. Data center 110 may determine that it is necessary to notify when a number of terminals accessing data center 110 becomes equal to or smaller than a certain number. Data center 110 may determine that it is necessary to notify when a load on data center 110 itself or program 116 becomes equal to or smaller than a certain value.

When data center 110 determines in step S1303 that it is necessary to notify terminal 120 that data 117 is updated, data center 110 notifies terminal 120 that the data is updated (S1304).

Data center 110 and terminal 120 perform data synchronization processing (S1305). Details of the data synchronization processing will be described later.

When the data synchronization processing is completed, terminal 120 notifies data center 110 that the synchronization processing is completed (S1306).

When data center 110 determines in step S1303 that it is unnecessary to notify terminal 120 that data 117 is updated, or when data center 110 receives the notification that the synchronization of step S1306 is completed, data center 110 ends the data update processing.

<Data Synchronization Processing>

When data center 110 notifies that data 117 is updated, terminal 120 updates data 122. When evaluation data is updated, terminal 120 performs similar user association processing.

Figure 25:
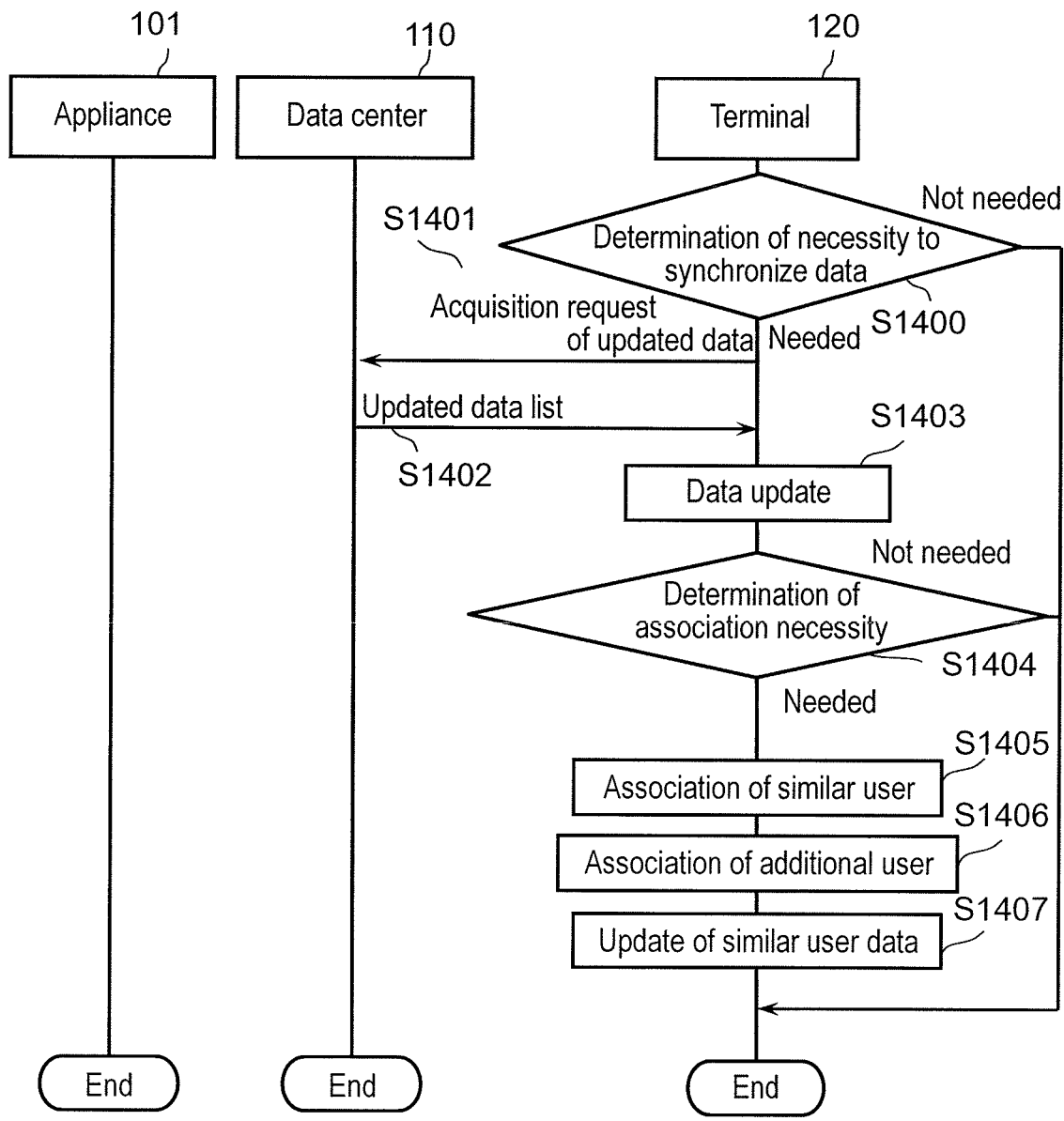
FIG. 25 illustrates data synchronization processing sequence of the information providing system according to the fifth exemplary embodiment of the present disclosure.

The following describes processing of terminal 120 synchronizing data 117 in data center 110 with data 122 in terminal 120 with reference to a flow chart of FIG. 25.

First, update information managing section 341 in terminal 120 determines whether data synchronization processing is necessary (S1400). When it is determined necessary to synchronize data in step S1400, update information managing section 341 in terminal 120 requests data center 110 to acquire updated data (S1401).

Data center 110 notifies terminal 120 of a list of data updated after the last notification (S1402). Data center 110 may notify terminal 120 of all the updated data simultaneously. Data center 110 may divide the updated data into a certain size and notify the updated data in several steps, or notify the updated data in several steps in arbitrary size.

Update information managing section 341 in terminal 120 updates data 122 using the data received from data center 110 (S1403). Similar user managing section 311 in terminal 120 determines whether it is necessary to change association of similar users (S1404). When it is determined necessary to change the association in step S1404, similar user managing section 311 acquires evaluation data from evaluation data managing section 302, and associates a similar user with each user from a list of the evaluation data acquired from evaluation data managing section 302 (S1405). Subsequently, when a dissimilar user is not associated with any user among dissimilar users specified as an additional user for each user, similar user managing section 311 associates the additional user as a similar user (S1406). Finally, similar user managing section 311 updates data regarding the similar user in data 122 to data regarding the new similar user (S1407).

When it is determined in step S1400 that it is unnecessary to synchronize data, update information managing section 341 in terminal 120 ends the data synchronization processing. When it is determined in step S1404 that it is unnecessary to change the association, similar user managing section 311 in terminal 120 ends the data synchronization processing.

<Recommendation Information Display Processing, Dissimilar User Addition Processing>

Among recommendation information display processing and dissimilar user addition processing, processing performed by data center 110 in the second exemplary embodiment of the present disclosure is performed by controlling section 340 in terminal 120 in the fifth exemplary embodiment of the present disclosure. That is, communication between data center 110 and terminal 120 in the second exemplary embodiment corresponds to processing closed within terminal 120 in the fifth exemplary embodiment. That is, the request (S1100 of FIG. 19, S1201 of FIG. 20) from terminal 120 to data center 110 and the notification (S1105 and S1109 of FIG. 19, S1207 of FIG. 20) from data center 110 to terminal 120 correspond to communication between modules within terminal 120.

When compared with each sequence (FIG. 19, FIG. 20) of the first exemplary embodiment, in response to a request for recommendation of a store from a user, terminal 120 performs the following processing rather than requesting another section as in step S1100. That is, controlling section 340 in terminal 120 performs the processing from step S1101 to step S1108, and terminal 120 finally displays recommendation information (S1110). Also when a dissimilar user to be added to similar users is selected, controlling section 340 in terminal 120 performs processing from step S1202 to step S1206 rather than generating a list and requesting another section as in step S1200 and S1201. In this case, processing of a request for acquisition of store information or user information from service provider 130 to data center 110 corresponds to a request for data acquisition from similar user managing section 311 or recommendation calculating section 312 to store information managing section 301 or user information managing section 303.

The present disclosure is of course not limited to the first to fifth exemplary embodiments described above. The present disclosure also Includes the following cases of (1) to (10).

(1) While check information display area 127 in the above-described embodiments displays user information and a check box for showing whether to add a user to similar users so as to add a dissimilar user with the check box being checked to similar users, check information display area 127 is not limited to this method. For example, check information display area 127 only needs to be a display that shows which dissimilar user is to be added as a similar user, and does not need to be a check box. For example, check information display area 127 may display only user information at first. When a user who receives information touches user information of a user to be added to similar users, check information display area 127 may change the display method so as to show that the user to be added to similar users is selected. Specifically, check information display area 127 may display a mark such as a check mark automatically at a head of the user information, may change the color of a character displayed, or may change the background color of the character.

Check information display area 127 may also include an additional user storage area for storing a user to be added to similar users as well as may display user information. In this case, when a user who receives information selects a user to be added to similar users by touching the user information, terminal 120 may shift the touched user to an additional user storage area automatically. Check information display area 127 may display the user information so as to clearly show that the user is selected, and may also display the user information in the additional user storage area simultaneously. Check information display area 127 may be configured so that a user who receives information can drag user information of a user to be added to similar users to the additional user storage area while preserving the touch thereon, and can drop the user information into the additional user storage area. At this time, a push on addition button 128 causes the user stored in the additional user storage area to be notified to the system as a user to be added to similar users.

(2) In the dissimilar user addition processing in the above-described embodiments, a user who receives information selects a user to be added to similar users and adds the selected user as a similar user. However, the dissimilar user addition processing is not limited to this method. The dissimilar user addition processing only needs to be processing that reflects an intention of the user who receives information. For example, a user who receives information may specify a user who has specific preference information as a similar user. In this case, in the dissimilar user addition processing, a user who receives information may select only preference information. The information providing system may then extract a dissimilar user who has the selected preference by using user preference information managing section 304 etc., and may add the extracted dissimilar user to similar users. The dissimilar user addition processing may be configured to extract preference information common to a user to be added to similar users, the user being selected by a user who receives information. The dissimilar user addition processing may be configured to extract a dissimilar user who has the common preference information from among entire dissimilar users, and to add the dissimilar user to similar users. At this time, check information display area 127 does not need to display information such as a name for identifying the user as user information, and may display only preference information (for example, FIG. 16 (B)). The preference information to display may include all preference information that the dissimilar user has, and may include only preference information that many dissimilar users have. The dissimilar user addition processing may determine which preference information to display based on preference information set for the user who receives information. Specifically, when a favorite food type and a field of a favorite cooking method are set for the user who receives information as preference information, the dissimilar user addition processing may determine to display another preference information of the field, and conversely may determine to display preference information of a field that is not set. The dissimilar user addition processing may determine to display preference information of a user for whom identical information in an identical field is set, the preference information being regarding another field.

(3) While similar user managing section 311 in the above-described embodiments is configured to determine whether two arbitrary users have an identical-tendency hobby and preference based on an evaluation value of evaluation data, the determination method is not limited to this method. For example, similar user managing section 311 may determine whether two arbitrary users have an identical-tendency hobby and preference based on whether the two users have similar preference information. Alternatively, similar user managing section 311 may combine the method of determination based on an evaluation value with the method of determination based on preference information.

(4) While recommendation calculating section 312 in the above-described embodiments determines a store to be recommended to a user who receives information based on an evaluation value etc., the determination method is not limited to this method. Recommendation calculating section 312 may determine a store to be recommended based on a store category and preference information of the user. Recommendation calculating section 312 may compare a store category and user's preference information in an identical field, and may determine a store with many coincident items as a store to be recommended, based on, for example, whether a type of food served at a store is identical to a type of food the user likes, whether a major food material served at a store is identical to a food material the user likes, and whether a cooking method of a main menu served at a store is identical to a cooking method the user likes.

In addition, preference that a user does not like may be registered as preference information of the user. A category of a store is then compared with the preference that the user does not like, and any store with a coincident item may be removed from stores to be recommended. Another method is to register in advance into the system a combination in which a store category does not coincide with preference information of a user. Any store with an item that coincides with the combination may be removed from stores to be recommended. Examples of combinations in which a category and preference information do not coincide include the following. The combinations may include, for example, a case where "sweet" is registered as a store category and "hot" is registered as preference information of a user. The combinations may include a case where "egg" is registered as a store category and "egg-free" and "for those with egg allergies" are registered as preference information of a user. The combinations may include a case where "fatty" is registered as a store category and "light-seasoned" is registered as preference information of a user. In addition to the examples described above, the combinations may include a combination of words and phrases that have opposite meanings in an identical field, such as "hot" and "sweet", and "fatty" and "light-seasoned". The combinations may include a combination of a category and preference information that are not selected together because the category and preference information are in different fields, such as "egg" and "for those with egg allergies". While these combinations are registered in the system in advance, the combinations may include the following cases. For example, from among preference information of a user and a category of a store that the user evaluates, a combination of preference information and a category is extracted. Then it may be determined whether to remove the store from stores to be recommended when a number of the combinations is small.

As described above, when preference that a user does not like is registered as preference information, or when a combination is registered in the system in advance in which a category of a store does not coincide with preference information of the user, determination may be made as follows. When the category of the store does not coincide with the preference of the user, an evaluation value set by the user may not be used for recommendation calculation. The case where the category of the store does not coincide with the preference of the user refers to a case where comparison between the category of the store and the preference that the user does not like shows a coincident item, and to a case of a combination in which the category of the store does not coincide with preference information of the user.

(5) The information providing system in the above-described embodiments extracts a similar user who has preference similar to preference of a user based on an evaluation value for a restaurant or a grocery store, determines information to be recommended based on information about the similar user, and provides the user with information. However, the information providing system is not limited to this example. For example, from a model number of a home appliance included in a home appliance purchase history, the information providing system may extract a user who purchases a similar home appliance as a similar user. The information providing system may then determine information to be recommended to the user from among a home appliance that the similar user purchases, and may recommend the home appliance to the user. The information providing system may associate information such as a design tendency, color, and characteristic function with each home appliance in advance, and may extract a user who purchases a home appliance with a similar design as a similar user. The information providing system may extract a user who purchases a home appliance with a similar color as a similar user. By extracting a user who purchases a home appliance with a similar function as a similar user, the information providing system may recommend furniture that the similar user purchases, such as a curtain, a carpet, and a shelf. The information providing system may recommend a curtain, a carpet, and furniture from a purchase history of clothing, such as clothes, instead of a home appliance, and may recommend a home appliance. This makes it possible to provide information about various products that suit the user based on information about a user who possesses similar goods.

The information providing system may further extract the following information from a viewing history of television programs, and recommend a recipe, product, store, place, and the like to the user based on the extracted information. The extracted information is information extracted from information regarding program content added to each television program. Specifically, the extracted information includes information about what kind of other programs a user watching a similar program watches, what kind of recipe of food a user makes immediately after the user watches a program with similar content, what kind of product a user purchases immediately after the user watches a program with similar content. This makes it possible to, for example, recommend a recipe regarding food that appears in the television program. This also makes it possible to recommend a recipe of food good for health after watching a program about health. This also makes it possible to recommend a store and region introduced in a television program.

When a schedule of the user shows that the user takes a lesson such as a lesson at a cooking school, the information providing system may further extract a user who takes a similar lesson as a similar user. The information providing system may recommend a food material, cookware, a tool used in the lesson, and the like from information such as a purchase history of a mail order and a purchase history of a credit card of the similar user. The information providing system may recommend a recipe similar to a recipe of food learned at the cooking school or the like.

(6) The above description has been given for an example where group 100 in the above-described embodiments is a house, but group 100 is not limited to this example. For example, when group 100 is assumed to be a car, the information providing system may extract a similar user from the following information. The information includes, for example, a path and destination of the car, speed and acceleration of the car, and a method of using an accelerator and a brake (amount of pushing down, speed of pushing down, frequency). The information also includes a number of revolutions of an engine or a tire, speed in operating a steering wheel, and relationship between a shape of a road and a method of using the steering wheel, accelerator, and brake. The information also includes information from various sensors inside the car and history information thereof, relationship therebetween, and evaluation of operation by a passenger in the car. The information providing system may extract a similar user who drives a car similarly from among at least part of these pieces of information, may recommend a driving method, and may give notice based on ecology orientation, safety orientation, and risk of car accident of a person who drives similarly. The information providing system may recommend a destination for the car, a place suitable for dropping in, a course or destination in consideration of remaining battery power, and the like in cooperation with a home appliances history.

Figure 26:
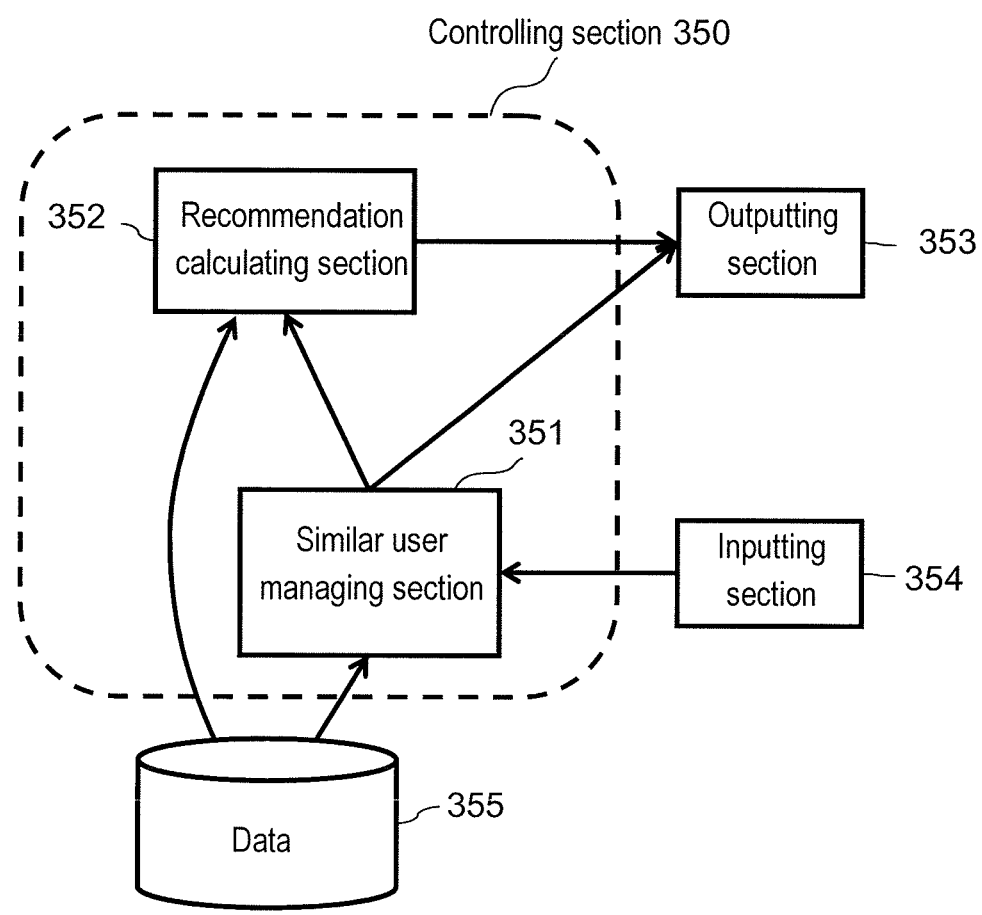
FIG. 26 illustrates a minimum configuration of the information providing system according to the present disclosure.

(7) While the information providing system in the above-described embodiments is configured to have various components and to perform various kinds of processing, the information providing system is not limited to these examples. That is, as illustrated in FIG. 26, the information providing system may include controlling section 350, outputting section 353, inputting section 354, and data 355. Controlling section 350 may include similar user managing section 351 and recommendation calculating section 352. Similar user managing section 351 operates in the same way as similar user managing section 311 of FIG. 7. Similar user managing section 351 however accesses data 355 directly. Transmission to terminal 120 is performed using outputting section 353, and reception from terminal 120 is performed using inputting section 354. Recommendation calculating section 352 operates in the same way as recommendation calculating section 312 of FIG. 7. Recommendation calculating section 352 however accesses data 355 directly. Transmission to terminal 120 is performed using outputting section 353, and reception from terminal 120 is performed using inputting section 354.

Figure 27:
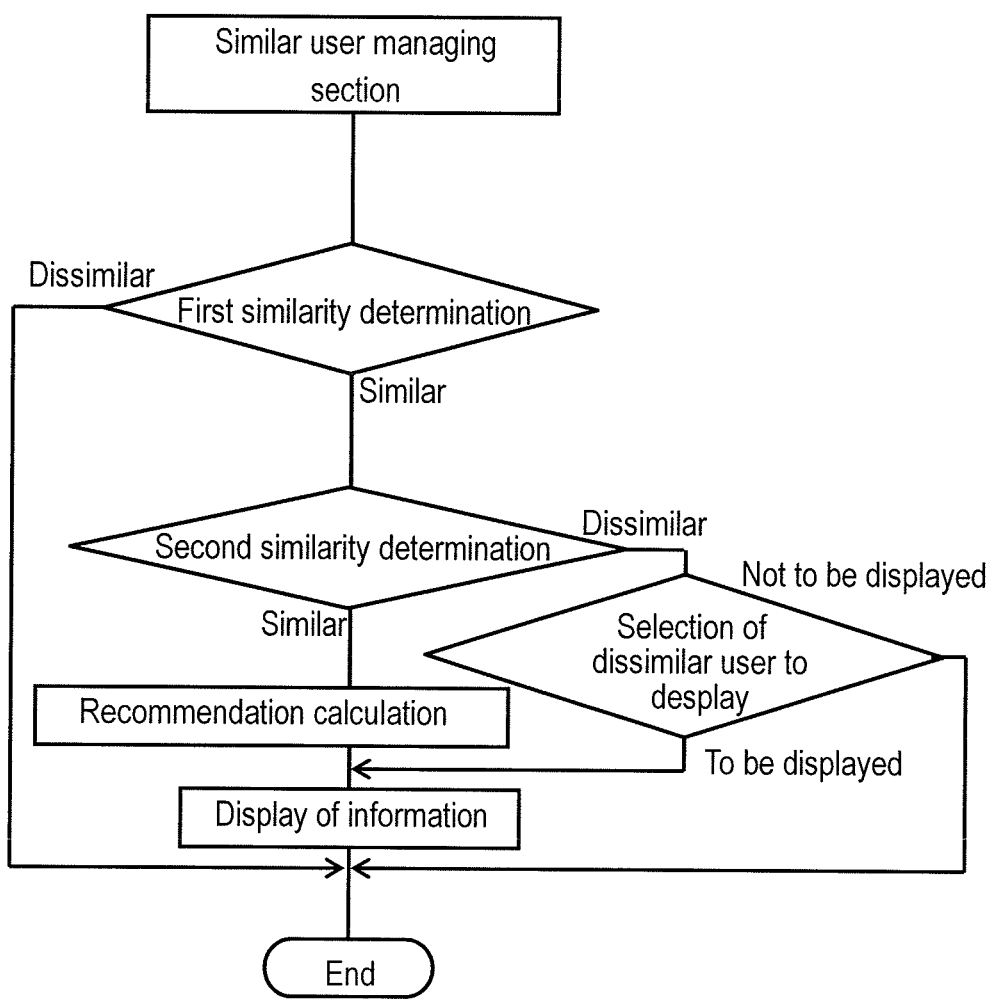
FIG. 27 illustrates sequence at a time of dissimilar user selection according to the present disclosure.

(8) The information providing system in the above-described embodiments performs recommendation calculation based on a similar user who has preference similar to preference of a user, and shows a dissimilar user who does not have preference similar to preference of a targeted user. The information providing system however is not limited to this example. For example, as illustrated in FIG. 27, the information providing system may determine whether preference is similar to the preference of the targeted user by performing determination twice or more rather than performing determination at a time. For determination of whether preference is similar to the preference of the targeted user, only a user determined to be similar at least once may be shown to the targeted user as a dissimilar user. This makes it possible to show a dissimilar user with a higher possibility of selection by the user because a user determined to be similar at least once is shown as a dissimilar user.

(9) Specifically, each device of the present disclosure is a computer system that includes a microprocessor, a ROM, a RAM, a hard disk unit, a display unit, a keyboard, and a mouse. The above-described RAM or hard disk unit stores a computer program. Operation of the microprocessor according to the computer program allows each device to achieve its function. The computer program includes a combination of a plurality of instruction codes each representing a command for the computer in order to achieve a predetermined function.

(10) Part or all of the components constituting each device of the present disclosure may include one system LSI (Large Scale Integration). The system LSI is a super-multifunctional LSI manufactured by integrating a plurality of components on one chip. Specifically, the system LSI is a computer system including a microprocessor, ROM, RAM, etc. The RAM stores the computer program. Operation of the microprocessor according to the computer program allows the system LSI to achieve its function.

Each of the components that constitute each device of the present disclosure may be individually integrated into one chip, or may be integrated into one chip so that the chip contains part or all of the components.

While the chip described above is herein referred to as a system LSI, the chip may be referred to as an IC, LSI, super LSI, or ultra LSI depending on a difference in degree of integration. A technique for circuit integration is not limited to an LSI. Circuit integration may be achieved by a dedicated circuit or a general-purpose processor. An FPGA (Field Programmable Gate Array) or a reconfigurable processor may be used, the FPGA being programmable after manufacturing of the LSI, the reconfigurable processor allowing reconfiguration of connection and setting of a circuit cell inside the LSI.

Furthermore, after development of a circuit-integration technology that replaces an LSI with more advanced semiconductor technology or another derivative technology, of course the technology may be used to integrate a functional block. Possible application of biotechnology etc. can be considered.

(11) Part or all of the components that constitute each of the devices described above may include an IC card detachable from each device or a discrete module. The IC card or the module is a computer system that includes a microprocessor, a ROM, a RAM, etc. The IC card or the module may include the super-multifunctional LSI described above. Operation of the microprocessor according to the computer program allows the IC card or the module to achieve its function. The IC card or the module may be tamper-proof.

(12) The present disclosure may be the methods described above. The present disclosure may be a computer program that causes a computer to achieve these methods, and may be a digital signal made of the computer program.

The present disclosure may be the computer program or the digital signal recorded in a computer-readable recording medium, such as, for example, a flexible disk, a hard disk, a CD-ROM, an MO (Magneto-Optical disk), a DVD, a DVD-ROM, a DVD-RAM, a Blu-ray (registered trademark) Disc (BD), or a semiconductor memory. The present disclosure may be the digital signal recorded in these recording media.

The present disclosure may be configured to transmit the computer program or the digital signal via a network typified by an electric telecommunication line, wireless or wired communication line, and the Internet, data broadcasting, etc.

The present disclosure may be a computer system that includes a microprocessor and a memory, the memory storing the computer program, the microprocessor operating according to the computer program.

The present disclosure may cause another independent computer system to execute the program or the digital signal by recording into the recording medium and transferring the program or the digital signal, or by transferring the program or the digital signal via the network or the like.

(13) The present disclosure may be configured by combining each of the above-described embodiments and the above-described variations.

The information providing system, information providing device, and information providing method according to the present disclosure include an inputting section for a user of the system to add another user to be added to a similar user managing section as similar users. When information provided by the information providing system does not suit preference of the user of the system, the information providing system allows the user to select a similar user. Therefore, the present system is useful as an information providing system that can improve accuracy of information to be provided to the user of the system.

REFERENCE MARKS IN THE DRAWINGS

10, 20: User
100: Group
101: Appliance group
102: Home gate way
110: Data center
111, 113, 116, 121, 131, 141, 142: Program
112, 114, 117, 122, 132, 355: Data
115: OS/middleware
120: Terminal
124: Store information display area
125: User information display area
126: Additional intention input button
127, 127': Check information display area
128: Addition button
129: Store information re-display area
130: Service provider
140: Application provider
200: User information list
201: Appliance list
202: Similar user list
203: Preference information list
210: Home appliance history
220: Store information list
230: Evaluation value lists
300, 310, 320, 340, 350: Controlling section
301: Store information managing section
302: Evaluation data managing section
303: User information managing section
304: User preference information managing section
305: Appliance history information managing section
311, 321: Similar user managing section
312, 322: Recommendation calculating section
313: Terminal communicating section
314: Data center communicating section
315: Similar user storing section
330: Displaying section
331: Inputting section
341: Update information managing section
342: Data storing section
351: Similar user managing section
352: Recommendation calculating section
353: Outputting section
354: Inputting section

What is claimed is:

1. An information providing method for providing recommended driving information to a first user of a first vehicle, comprising:
    transmitting a request, with a first processor of the first user, via a network, for recommended driving information for the first user to be received and stored in a first memory and displayed on a display of the first user;
    receiving from the network and storing in a second memory with a second processor driving data from a plurality of vehicles about the manner in which a plurality of users operate the accelerator, the steering wheel, or the brake of their vehicles including the first user;
    extracting with the second processor from the second memory a similar user from among the plurality of users who drives a vehicle with a predetermined similarity to the manner in which the first user operates the accelerator, the steering wheel, or the brake of a vehicle, and determining recommended driving information of the similar user from the similar user's driving history;
    transmitting, with the second processor, over the network to the first processor, the recommended driving information of the similar user, which is stored in the first memory; and
    displaying on the display of the first user, as instructed by the first processor, the recommended driving information of the similar user.

2. The information providing method recited in claim 1, wherein the second processor performs the extracting operation to extract the similar user based on a comparison of at least one of the following parameters of the first user's driving history and the similar user's driving history:

speeds of the vehicles driven by the first user and the similar user, accelerations of the vehicles driven by the first user and the similar user, methods of using an accelerator and a brake of the vehicles driven by the first user and the similar user, a number of revolutions of an engine or a tire of the vehicles driven by the first user and the similar user, a speed of operating a steering wheel of the vehicles driven by the first user and the similar user, a relationship between a shape of a road and a method of using the steering wheel, accelerator, and brake of the vehicles driven by the first user and the similar user, information from sensors inside the vehicles driven by the first user and the similar user, a history of the information from the sensors inside the vehicles driven by the first user and the similar user, a relationship between the history information and the sensor information of the vehicles driven by the first user and the similar user, and an evaluation of operation of the vehicles by a passenger in the vehicles driven by the first user and the similar user.

3. The information providing method recited in claim 2, wherein the displayed recommended driving information of the similar user displayed on the display of the first user includes at least one of:
  a) a recommended driving method based on the similar user's driving history,
  b) an ecology notice based on the similar user's driving history,
  c) a safety notice based on the similar user's driving history,
  d) a notice on the risk of a car accident based on the similar user's driving history,
  e) a recommended destination based on the similar user's driving history, and
  f) a recommended destination reachable with a remaining battery power of the vehicle of the first user based on the similar user's driving history.

4. The information providing method recited in claim 1, wherein the displayed recommended driving information of the similar user displayed on the display of the first user includes at least one of:
  a) a recommended driving method based on the similar user's driving history,
  b) an ecology notice based on the similar user's driving history,
  c) a safety notice based on the similar user's driving history,
  d) a notice on the risk of a car accident based on the similar user's driving history,
  e) a recommended destination based on the similar user's driving history, and
  f) a recommended destination reachable with a remaining battery power of the vehicle of the first user based on the similar user's driving history.

5. The information providing method recited in claim 1, further comprising:
  extracting with the second processor from the second memory fewer than all of the plurality of users as a plurality of similar users who drive vehicles with a predetermined similarity to the manner in which the first user operates the accelerator, the steering wheel, or the brake of the vehicle, and determining recommended driving information of the similar users from the similar users' driving history to be displayed on the display of the first user;
  transmitting, with the second processor, over the network to the first processor, the recommended driving information of the similar users, which is stored in the first memory; and
  displaying on the display of the first user, as instructed by the first processor, the recommended driving information of the similar users.

6. The information providing method recited in claim 5, further comprising:
  displaying on a first screen the recommended driving information;
  also displaying on the first screen a name of at least one dissimilar user not extracted from the second memory as not having the predetermined similarity to the manner in which the first user operates the accelerator, the steering wheel, or the brake of the vehicle;
  receiving, with the second processor, recommended driving information about the at least one dissimilar user not extracted from the second memory as not having the predetermined similarity to the manner in which the first user operates the accelerator, the steering wheel, or the brake of the vehicle;
  adding the at least one dissimilar user to the similar users and re-determining the recommended driving information based on a set of users including the similar users and the added at least one dissimilar user in response to a first user input;
  transmitting, with the second processor, over the network to the first processor, the re-determined recommended driving information based on the combination of the similar users' driving history and the at least one dissimilar user's driving history, which is stored in the first memory; and
  displaying on the display of the first user, as instructed by the first processor, the re-determined recommended driving information based on the combination of the similar users' driving history and the at least one dissimilar user's driving history.

7. The information providing method recited in claim 6, further comprising:
  also displaying on the first screen a user-selectable input button; and
  displaying a second screen on the display of the first user device in response the selection of the user-selectable input button on the first screen, the displayed second screen displaying
    the name of the at least one dissimilar user not extracted from the second memory as not having the predetermined similarity to the manner in which the first user operates the accelerator, the steering wheel, or the brake of the vehicle,
    a selectable area associated with each displayed dissimilar-user name permitting selection of dissimilar users associated with the displayed dissimilar user names, and
    a user-selectable add button for adding a selected dissimilar user to the similar users so that the driving histories of the dissimilar user and the similar users are used to re-determine the recommended driving information.

8. The information providing method recited in claim 7, further comprising:
  adding the at least one dissimilar user to the similar users and re-determining the recommended driving information based on a set of users including the similar users and the added at least one dissimilar user in response to selecting the selectable area of the at least one displayed dissimilar-user name and selecting the user-selectable add button on the second screen;

transmitting, with the second processor, over the network to the first processor, the re-determined recommended driving information based on the combination of the similar users' driving history and the at least one dissimilar user's driving history, which is stored in the first memory; and displaying on the display of the first user, as instructed by the first processor, the re-determined recommended driving information of the combination of the similar users' driving history and the at least one dissimilar user's driving history.

9. An information providing device for providing recommended driving information to a first user of a first vehicle, comprising:

a terminal device of the first user having a display for displaying the recommended driving information for the first user;

a first memory;

a communicating interface for transmitting a request, via a network, for the recommended driving information for the first user to be received and stored in the first memory and displayed on the display of the terminal device of the first user; and receiving the recommended driving information for the first user from a second processor via the network and storing the recommended driving information for the first user in the first memory; and a controller comprising a first processor configured to:

transmit via the communication interface the request for recommended driving information for the first user to be received and stored in the first memory and displayed on the display of the terminal of the first user, receive via the communication interface or extract, from driving data about the manner in which a plurality of users operate the accelerator, the steering wheel, or the brake of their vehicles including the first user, a similar user from among the plurality of users who drives a vehicle with a predetermined similarity to the manner in which the first user operates the accelerator, the steering wheel, or the brake of a vehicle;

receive via the communication interface or determine recommended driving information of the similar user from the similar user's driving history; and display on the display of the terminal of the first user, the recommended driving information of the similar user.

10. The information providing device recited in claim 9, wherein the extracting operation extracts the similar user, or the controller receives the extracted similar user determined to be the similar user, based on a comparison of at least one of the following parameters of the first user's driving history and the similar user's driving history:

speeds of the vehicles driven by the first user and the similar user, accelerations of the vehicles driven by the first user and the similar user, methods of using an accelerator and a brake of the vehicles driven by the first user and the similar user, a number of revolutions of an engine or a tire of the vehicles driven by the first user and the similar user, a speed of operating a steering wheel of the vehicles driven by the first user and the similar user, a relationship between a shape of a road and a method of using the steering wheel, accelerator, and brake of the vehicles driven by the first user and the similar user, information from sensors inside the vehicles driven by the first user and the similar user, a history of the information from the sensors inside the vehicles driven by the first user and the similar user, a relationship between the history information and the sensor information of the vehicles driven by the first user and the similar user, and an evaluation of operation of the vehicles by a passenger in the vehicles driven by the first user and the similar user.

11. The information providing device recited in claim 10, wherein the displayed recommended driving information of the similar user displayed on the display of the terminal of the first user includes at least one of:

a) a recommended driving method based on the similar user's driving history, b) an ecology notice based on the similar user's driving history, c) a safety notice based on the similar user's driving history, d) a notice on the risk of a car accident based on the similar user's driving history, e) a recommended destination based on the similar user's driving history, and f) a recommended destination reachable with a remaining battery power of the vehicle of the first user based on the similar user's driving history.

12. The information providing device recited in claim 9, wherein the displayed recommended driving information of the similar user displayed on the display of the terminal of the first user includes at least one of:

a) a recommended driving method based on the similar user's driving history, b) an ecology notice based on the similar user's driving history, c) a safety notice based on the similar user's driving history, d) a notice on the risk of a car accident based on the similar user's driving history, e) a recommended destination based on the similar user's driving history, and f) a recommended destination reachable with a remaining battery power of the vehicle of the first user based on the similar user's driving history.

13. The information providing device recited in claim 9, wherein the controller further:

receives via the communication interface or extracts fewer than all of the plurality of users from the plurality of users as a plurality of similar users who drive a vehicle with a predetermined similarity to the manner in which the first user operates the accelerator, the steering wheel, or the brake of the vehicle, and receives or determines recommended driving information of the similar users from the similar users' driving history to be displayed on the display of the terminal of the first user;

stores the recommended driving information of the similar users, in the first memory; and displays on the display of the terminal of the first user, the recommended driving information of the similar users.

14. The information providing device recited in claim 13, wherein the controller further:
- displays on a first screen of the display the recommended driving information of the similar users;
- also displays on the first screen a name of at least one dissimilar user not extracted from the plurality of users as not having the predetermined similarity to the manner in which the first user operates the accelerator, the steering wheel, or the brake of the vehicle;
- receives recommended driving information about the at least one dissimilar user not extracted from the plurality of users as not having the predetermined similarity to the manner in which the first user operates the accelerator, the steering wheel, or the brake of the vehicle;
- adds the at least one dissimilar user to the similar users and re-determines the recommended driving information based on a set of users including the similar users and the added at least one dissimilar user in response to a first user input, or receives the re-determined recommended driving information based on the set of users including the similar users and the added at least one dissimilar user in response to a first user input; and
- displays on the display of the terminal of the first user, the re-determined recommended driving information based on the combination of the similar users' driving history and the at least one dissimilar user's driving history.

15. The information providing device recited in claim 14, wherein the controller further:
- displays on the first screen of the display of the terminal of the first user a user-selectable input button;
- displays a second screen on the display of the terminal of the first user in response the selection of the user-selectable input button on the first screen, the displayed second screen displaying
  - the name of the at least one dissimilar user not extracted from the second memory as not having the predetermined similarity to the manner in which the first user operates the accelerator, the steering wheel, or the brake of the vehicle,
  - a selectable area associated with each displayed dissimilar-user name permitting selection of dissimilar users associated with the displayed dissimilar user names, and
  - a user-selectable add button for adding a selected dissimilar user to the similar users so that the driving histories of the dissimilar user and the similar users are used to re-determine the recommended driving information.

16. The information providing device recited in claim 15, wherein the controller further:
- adds the at least one dissimilar user to the similar users and re-determines the recommended driving information based on a set of users including the similar users and the added at least one dissimilar user in response to selecting the selectable area the at least one displayed dissimilar-user name and selecting the user-selectable add button on the second screen or receives the re-determined recommended driving information based on a set of users including the similar users and the added at least one dissimilar user in response to selecting the selectable area the at least one displayed dissimilar-user name and selecting the user-selectable add button on the second screen; and
- displays on the display of the terminal of the first user, the re-determined recommended driving information based on the combination of the similar users' driving history and the at least one dissimilar user's driving history.

\* \* \* \* \*